(12) United States Patent
Sung et al.

(10) Patent No.: US 11,071,938 B2
(45) Date of Patent: Jul. 27, 2021

(54) CARBON DIOXIDE CAPTURING APPARATUS USING COLD HEAT OF LIQUEFIED NATURAL GAS AND POWER GENERATION SYSTEM USING SAME

(71) Applicant: DOOSAN HEAVY INDUSTRIES & CONSTRUCTION CO., LTD., Changwon-si (KR)

(72) Inventors: Hwachang Sung, Seoul (KR); Songhun Cha, Osan-si (KR)

(*) Notice: Subject to any disclaimer, the term of this patent is extended or adjusted under 35 U.S.C. 154(b) by 287 days.

(21) Appl. No.: 16/142,259

(22) Filed: Sep. 26, 2018

(65) Prior Publication Data

US 2019/0151789 A1   May 23, 2019

(30) Foreign Application Priority Data

Nov. 22, 2017  (KR) .................. 10-2017-0156474
Nov. 22, 2017  (KR) .................. 10-2017-0156475

(51) Int. Cl.
  *F23J 15/00* (2006.01)
  *B01D 53/00* (2006.01)
  (Continued)

(52) U.S. Cl.
  CPC ......... *B01D 53/002* (2013.01); *B01D 5/0003* (2013.01); *B01D 5/0075* (2013.01);
  (Continued)

(58) Field of Classification Search
  CPC ........ F25J 3/067; F25J 2270/18; F25J 3/0266; F17C 9/04; F17C 9/02; Y02C 23/40; Y02E 20/32; B01D 53/002
  (Continued)

(56) References Cited

U.S. PATENT DOCUMENTS

2008/0302133 A1* 12/2008  Saysset ................ F25J 3/067
                                                              62/617

FOREIGN PATENT DOCUMENTS

CN    104520660 A    4/2015
CN    104948246 A    9/2015
(Continued)

OTHER PUBLICATIONS

A Korean Office Action dated Dec. 27, 2018 in connection with Korean Patent Application No. 10-2017-0156475 which corresponds to the above-referenced U.S. application.
(Continued)

*Primary Examiner* — Elizabeth J Martin
*Assistant Examiner* — Nael N Babaa
(74) *Attorney, Agent, or Firm* — Harvest IP Law, LLP

(57) ABSTRACT

A carbon dioxide capturing apparatus using cold heat of liquefied natural gas (LNG) includes a heat exchanger to cool primary coolant using heat exchange between the primary coolant and the LNG; a chiller connected to the heat exchanger and configured to discharge capturing coolant colder than the primary coolant by performing a heat exchange between the capturing coolant and a cooling material; and a capturing cooler configured to capture carbon dioxide contained in flue gas by performing a heat exchange between the capturing coolant discharged from the chiller and the flue gas. A power generation system includes an LNG storage facility; a power generation facility discharging flue gas; a unit for heat exchange between the LNG and a coolant to regasify the LNG and cool the coolant; and a unit for capturing carbon dioxide contained in the flue gas by heat exchange between the discharged flue gas and the coolant.

20 Claims, 14 Drawing Sheets

(51) Int. Cl.
*B01D 5/00* (2006.01)
*F25J 3/02* (2006.01)
*F02C 7/22* (2006.01)
*F23R 3/30* (2006.01)
*F23J 15/06* (2006.01)
*F02C 3/22* (2006.01)

(52) U.S. Cl.
CPC .......... *F02C 3/22* (2013.01); *F02C 7/22* (2013.01); *F23J 15/006* (2013.01); *F23J 15/06* (2013.01); *F23R 3/30* (2013.01); *F25J 3/0219* (2013.01); *F25J 3/0266* (2013.01); *B01D 2257/504* (2013.01); *F05D 2210/12* (2013.01); *F05D 2260/232* (2013.01); *F05D 2260/61* (2013.01); *F23J 2215/50* (2013.01); *F23J 2900/15061* (2013.01); *F25J 2205/20* (2013.01); *F25J 2210/70* (2013.01); *F25J 2230/04* (2013.01); *F25J 2270/12* (2013.01); *F25J 2270/14* (2013.01); *F25J 2270/30* (2013.01); *F25J 2270/42* (2013.01); *F25J 2270/58* (2013.01); *F25J 2270/60* (2013.01); *F25J 2270/80* (2013.01); *F25J 2270/902* (2013.01); *F25J 2270/904* (2013.01)

(58) Field of Classification Search
USPC .................................................. 62/50.2
See application file for complete search history.

(56) References Cited

FOREIGN PATENT DOCUMENTS

| | | |
|---|---|---|
| JP | 2627144 B2 | 7/1997 |
| JP | 2007-163072 A | 6/2007 |
| KR | 10-0370910 B1 | 3/2003 |
| KR | 10-1349518 B1 | 1/2014 |
| KR | 10-2014-0089527 A | 7/2014 |
| KR | 10-2015-0075845 A | 7/2015 |
| KR | 10-1545604 B1 | 8/2015 |
| KR | 10-1647465 B1 | 8/2016 |

OTHER PUBLICATIONS

A Korean Office Action dated Apr. 24, 2019 in connection with Korean Patent Application No. 10-2017-0156474 which corresponds to the above-referenced U.S. application.

* cited by examiner

CARBON DIOXIDE CAPTURING APPARATUS USING COLD HEAT OF LIQUEFIED NATURAL GAS AND POWER GENERATION SYSTEM USING SAME

CROSS REFERENCE TO RELATED APPLICATIONS

This application claims priority to Korean Patent Application No(s). 10-2017-0156474 and 10-2017-0156475 filed on Nov. 22, 2017, the disclosures of which are incorporated herein by reference in their entirety.

BACKGROUND OF THE INVENTION

1. Field of the Invention

The present invention relates to a carbon dioxide capturing apparatus for capturing carbon dioxide contained in flue gas discharged from a power generation facility using cold heat of liquefied natural gas (LNG) and to a power generation system using same.

2. Description of the Background Art

Natural gas (NG) is a collective term for naturally occurring gases including hydrocarbon gases and non-hydrocarbon gases. Natural gas occurs underground and is present as a gas when it comes out of the ground. Natural gas primarily consists of methane ($CH_4$) which accounts for about 80 to 90% according to the place of production, and additionally some flammable compounds such as ethane ($C_2H_6$) and propane ($C_3H_8$) which account for the rest. Liquefied natural gas (LNG) refers to natural gas artificially liquefied at low temperatures of about $-160°$ C.

Natural gas is extracted from oilfields or gas fields. For facilitating the extraction of natural gas from oilfields or gas fields, fracturing fluid (also called fracking fluid) such as steam, groundwater, seawater, and carbon dioxide is injected into a well bore. The natural gas extracted from an oil or gas field is delivered as liquefied natural gas (LNG) to consumers. LNG delivered to consumers needs to be regasified for use in consumer places or for distribution.

Seawater may be used for LNG regasification. However, the use of seawater for LNG regasification could have an unexpected impact on marine ecosystems. Alternatively, for LNG regasification, natural gas may be burned to generate heat which is used as energy for LNG regasification. This method has a disadvantage of energy waste.

The flue gas discharged from a thermal power station contains carbon dioxide, which is a serious environmental problem, such that reduced emission levels are highly desirable. For this reason, various technologies of carbon dioxide removal have been researched and developed but thus far have shown little effect in terms of cost and efficiency.

SUMMARY OF THE INVENTION

The present invention has been made in view of the problems occurring in the related art, and an objective of the present invention is to provide a carbon dioxide capturing apparatus for capturing carbon dioxide contained in flue gas discharged from a power generation facility using cold heat of liquefied natural gas and a power generation system including same.

According to one aspect of the present invention, a carbon dioxide capturing apparatus may include a heat exchanger configured to cool primary coolant using heat exchange between the primary coolant and liquefied natural gas (LNG); a chiller connected to the heat exchanger and configured to discharge capturing coolant that is colder than the primary coolant by performing a heat exchange between the capturing coolant and a cooling material; and a capturing cooler configured to capture carbon dioxide contained in flue gas by performing a heat exchange between the capturing coolant discharged from the chiller and the flue gas.

The cooling material may be the primary coolant supplied from the heat exchanger, and the chiller may cool the capturing coolant using the primary coolant supplied from the heat exchanger. The heat exchanger may be connected to a first coolant line that is connected to the chiller to transport the primary coolant to the chiller, and the capturing cooler may be connected to a second coolant line that is connected to the chiller. The chiller may include a compressor connected to the second coolant line and configured to compress the capturing coolant, an expansion unit installed on the second coolant line and configured to expand the capturing coolant, and a condenser installed between the compressor and the expansion unit and configured to condense the capturing coolant by performing heat exchange with the primary coolant. The heat exchanger may cool the primary coolant to a first temperature and may cool the capturing coolant to a second temperature, and the second temperature may have an absolute value that is 1.4 to 2.0 times an absolute value of the first temperature.

The apparatus may further include a gas cooler configured to cool the flue gas before the flue gas flows into the capturing cooler, wherein the heat exchanger is connected to a coolant supply line for transferring the coolant discharged from the heat exchanger to the coolant supply line and is connected to a coolant recovery line for transferring the coolant discharged from the gas cooler to the heat exchanger, and wherein the chiller is connected to the coolant supply line and the coolant recovery line.

The coolant supply line and the coolant recovery line may be connected to a first heat transfer line for supplying cold heat to the chiller. The chiller and the capturing cooler may be connected by a chilling line for receiving the cold heat from the first heat transfer line and for transferring the cold heat to the capturing cooler. The chiller may include a first compressor connected to the chilling line and configured to compress the capturing coolant, an expansion unit installed on the chilling line and configured to expand a coolant flowing along the chilling line, and a first condenser configured to condense the capturing coolant discharged from the first compressor by causing heat exchange with the first heat transfer line.

The coolant supply line and the coolant recovery line may be connected to a second heat transfer line configured to supply cold heat to the chiller, and the chiller may include a second compressor connected to the chilling line and configured to compress the capturing coolant discharged from the first condenser and a second condenser for condensing the capturing coolant discharged from the second compressor by using heat exchange with the second heat transfer line. Further, the first coolant line and the coolant recovery line may be connected to a third heat transfer line configured to supply cold heat to the chiller, and the chiller may include a third compressor connected to the chilling line and configured to compress the capturing coolant discharged from the second condenser and a third condenser for condensing the capturing coolant discharged from the third compressor by using heat exchange with the third heat transfer line.

The apparatus may further include a main compressor installed on the coolant supply line for controlling movement of the coolant; a main temperature sensor for measuring the temperature of the flue gas discharged from the gas cooler; a main compression control unit for controlling operation of the main compressor according to information received from the main temperature sensor; a first temperature sensor for measuring the temperature of the flue gas discharged from the capturing cooler; a first compression control unit for receiving information from the first temperature sensor and controlling operation of the first compressor; and a gas heater that heats the flue gas discharged from the capturing cooler and transfers a flue gas discharged from a power generation facility to the gas cooler, the gas heater including a water discharge portion for discharging condensate generated through condensation of the discharged flue gas.

The apparatus may further include a bypass line between the heat exchanger and the chiller for causing a portion of the primary coolant discharged from the heat exchanger to be transferred to a heat source, wherein the cooling material is made of liquefied natural gas, and the heat exchanger and the chiller are connected by a first natural gas line to transfer the liquefied natural gas discharged from the chiller to the heat exchanger, and wherein the chiller cools the primary coolant by performing a heat exchange between the liquefied natural gas and a portion of the primary coolant discharged from the heat exchanger. When the flow rate of the coolant flowing into the chiller from the heat exchanger is m1 wt % and the flow rate of the coolant flowing into the bypass line from the heat exchanger is m2 wt %, m1 is 0.4 to 1.5 times m2.

The apparatus may further include a temperature sensor for measuring the temperature of the flue gas discharged from the capturing cooler, wherein the chiller is connected to a first coolant line for transferring the capturing coolant discharged from the chiller to the capturing cooler, and wherein the first coolant line includes a control unit for controlling movement of the capturing coolant along the first coolant line according to information received from the temperature sensor. Here, the control unit may include a storage unit connected to the first coolant line for storing the coolant, a first coolant dumping line for transferring the coolant from the first coolant line to the storage unit, a second coolant dumping line connected to the first coolant line and configured to transfer the coolant from the bypass line to the storage unit, and a capturing coolant control line for transferring the coolant from the storage unit to the bypass line.

The apparatus may further include a gas cooler configured to cool the flue gas before the flue gas flows into the capturing cooler, wherein the gas cooler is connected to a second coolant line for transferring the coolant discharged from the capturing cooler to the gas cooler. The apparatus may further include a second heat exchanger installed between the heat exchanger and the chiller; a coolant transfer line connected to the second heat exchanger and configured to transport part of the coolant discharged from the second heat exchanger to the second coolant line; a first natural gas line connected to the second heat exchanger for transferring the liquefied natural gas discharged from the chiller to the second heat exchanger; a second natural gas line connected to the heat exchanger for transferring the liquefied natural gas discharged from the second heat exchanger to the heat exchanger; and a third coolant line that connects the gas cooler and the bypass line to each other and transfers the coolant discharged from the gas cooler to the bypass line. The apparatus may further include a third coolant line that connects the gas cooler and the bypass line to each other and transfers the coolant discharged from the gas cooler to the bypass line.

The apparatus may further include a gas heater that heats the flue gas discharged from the capturing cooler using the flue gas discharged from a heat source and cools the flue gas discharged from the heat source, and the gas heater may include a water discharge portion for discharging condensate generated through condensation of the discharged flue gas.

According to another aspect of the present invention, there is provided a power generation system using cold heat of liquefied natural gas (LNG). The system may include an LNG storage facility for storing the LNG; a power generation facility for generating power using fuel and discharging flue gas; a heat exchange unit in which heat exchange occurs between the LNG supplied from the LNG storage facility and a coolant so that the LNG is regasified into natural gas and the coolant is cooled, the heat exchange unit including a heat exchanger in which the coolant is cooled to a first temperature through heat exchange between the coolant and the LNG, and a chiller that discharges a capturing coolant generated through heat exchange between a portion of the coolant discharged from the heat exchanger and the LNG; and a capturing unit for capturing carbon dioxide contained in the flue gas by causing heat exchange between the discharged flue gas and the coolant, the capturing unit including a capturing cooler for separating carbon dioxide contained in the flue gas through heat exchange between the capturing coolant discharged from the chiller and the flue gas, and a gas cooler that preliminarily cools the flue gas using the coolant discharged from the capturing cooler before the flue gas flows into the capturing cooler. The heat exchange unit may further include a bypass line allowing a portion of the coolant discharged from the first exchanger to directly flow into the power generation facility while bypassing the heat exchange unit, and the capturing unit may further include a gas heater that heats the flue gas discharged from the capturing cooler and cools the flue gas discharged from the power generation facility by causing heat exchange between the flue gas discharged from the power generation facility and the flue gas discharged from the capturing cooler.

According to exemplary embodiments of the present invention, it is possible to reduce emissions of carbon dioxide to the atmosphere by capturing the carbon dioxide contained in the flue gas discharged from a power generation facility into dry ice using cold heat of liquefied natural gas.

In addition, since the heat exchange between the coolant and the liquefied natural gas is performed for capturing carbon dioxide, the safety of the carbon dioxide capturing process may be improved. Furthermore, since the coolant is cooled in two stages by a chiller, the coolant can be effectively cooled down to a cryogenic state.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE DISCLOSURE

Figure 1:
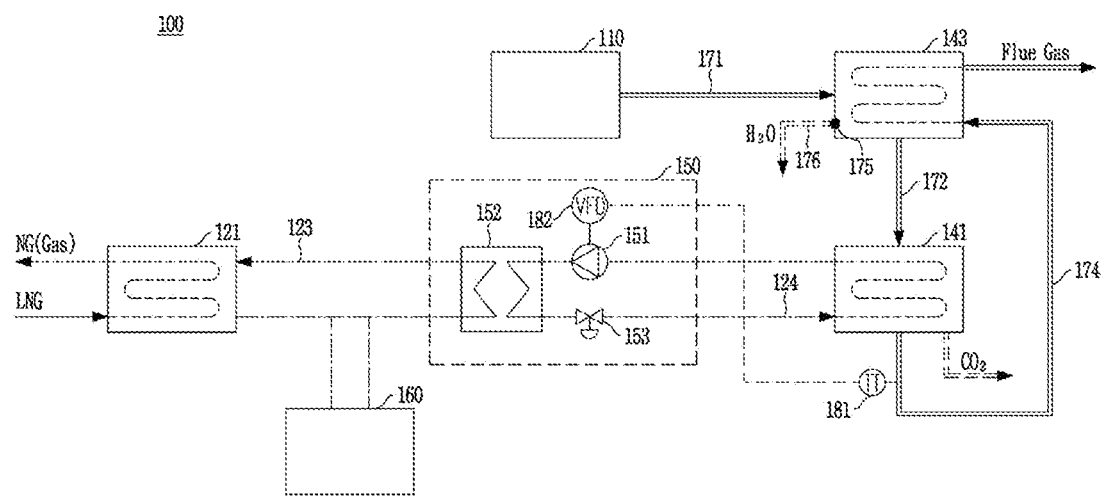
FIG. 1 is a block diagram illustrating a carbon dioxide capturing apparatus using cold heat of liquefied natural gas, according to a first embodiment of the present invention.

The present invention may be embodied in many forms and have various embodiments. Thus, specific embodiments will be presented and described in detail below. While specific embodiments of the invention will be described hereinbelow, they are only illustrative purposes and should not be construed as limiting to the invention. Therefore, the invention should be construed to cover not only the specific embodiments but also cover other embodiments and modifications and equivalents to the specific embodiments and other possible embodiments.

The terminology used herein is for the purpose of describing particular embodiments only and is not intended to limit the invention. As used herein, the singular forms "a", "an" and "the" are intended to include the plural forms as well, unless the context clearly indicates otherwise. It will be further understood that the terms "comprises" and/or "comprising," or "includes" and/or "including," when used in this specification, specify the presence of stated features, regions, integers, steps, operations, elements and/or components, but do not preclude the presence or addition of one or more other features, regions, integers, steps, operations, elements, components and/or groups thereof.

Hereinbelow, preferred embodiments of the invention will be described in detail with reference to the accompanying drawings. Throughout the drawings, elements having the same or substantially the same function are denoted by the same reference characters. In describing embodiments of the present disclosure, well-known functions or constructions will not be described in detail when it is determined that they may obscure the spirit of the present disclosure. Further, components not related to description of the present invention are not illustrated in the drawings and like reference numerals are given to like components.

FIG. 1 illustrates a carbon dioxide capturing apparatus 100 according to a first embodiment of the present invention.

Referring to FIG. 1, the carbon dioxide capturing apparatus 100 using cold heat of liquefied natural gas includes a heat exchanger 121, a chiller 150, a capturing cooler 141, a gas heater 143, and a storage unit 160.

In the apparatus of FIG. 1, a primary coolant and a capturing coolant may each be nitrogen, or may each include any one selected from the group consisting of nitrogen, argon, helium, and carbon dioxide. Furthermore, each of the primary coolant and the capturing coolant may include at least one selected from the group consisting of R14 ($CF_4$), R22 ($CHClF_2$), R23 ($CHF_3$), R116 ($C_2F_2$), and R218 ($C_3F_8$).

The heat exchanger 121 cools the primary coolant using the cold heat of liquefied natural gas (LNG), and the LNG is regasified in the heat exchanger 121. However, the present invention is not limited thereto. The LNG may not be phase-changed into gas in the heat exchanger 121 and may simply be heated, that is, without involving a phase change. The LNG supplied to the heat exchanger 121 may have a temperature within a range of −150° C. to −168° C. and a pressure of 100 bar. The heat exchanger 121 may be connected to a first coolant line 123 which is connected to the chiller 150 and transports the primary coolant. The primary coolant is a cooling material that transfers the cold heat of the LNG to the chiller 150 via the first coolant line 123 and then returns to the heat exchanger 121 in which the primary coolant is cooled by the LNG. The primary coolant may be cooled to a temperature within a range of −100° C. to −150° C. in the heat exchanger 121.

When the supply of the LNG is stopped or interrupted, the temperature of the primary coolant rises and thus the volume of the primary coolant increases, resulting in an increase in the internal pressure of the first coolant line 123. In order to address this issue, the first coolant line 123 may be connected to the storage unit 160.

That is, when the pressure of the first coolant line 123 rises to exceed a reference pressure, the coolant is discharged from the first coolant line 123 and is stored in the storage unit 160. On the contrary, when the pressure of the first coolant line 123 is lower than the reference pressure, the coolant flows from the storage unit 160 to the first coolant line 123. To this end, a pipe may be installed between the storage unit 160 and the first coolant line 123 so that the coolant may flow into and out of the storage unit, and a valve and a pump may be installed in the pipe.

The chiller 150 is connected to the first coolant line 123 and a second coolant line 124. The second coolant line 124 is connected to the chiller 150 and the capturing cooler 141 and transports the capturing coolant. The chiller 150 includes a compressor 151 connected to the second coolant line 124 to compress the capturing coolant, a condenser 152 for cooling (condensing) the compressed capturing coolant, and an expansion unit for expanding the condensed capturing coolant. Here, the expansion unit may be configured as an expansion valve 153.

The condenser 152 cools the capturing coolant flowing along the second coolant line 124 by using the heat exchange between the first coolant line 123 and the second coolant line 124. The condenser 152 is installed between the compressor 151 and the expansion valve 153. The compressor 151 compresses the capturing coolant and, through this compression, the temperature of the capturing coolant rises. This compressed capturing coolant is cooled by the condenser 152 and is transferred to the expansion valve 153. The compressed capturing coolant expands by passing through the expansion valve 153, so that the volume of the capturing coolant is increased and the temperature of the capturing coolant is lowered. This cooled capturing coolant is transferred to the capturing cooler 141.

The carbon dioxide capturing apparatus 100 according to the first embodiment of the present invention may further include a temperature sensor 181 that measures the temperature of the flue gas discharged from the capturing cooler 141 and a compression control unit 182 that receives information from the temperature sensor 181 and controls the compressor 151. The compression control unit 182 may be configured with a variable frequency drive (VFD). The compression control unit 182 controls the compressor 151 to increase the compression ratio when the temperature of the flue gas is higher than a reference temperature that is preset and to decrease the compression ratio when the temperature of the flue gas is lower than the reference temperature.

The capturing coolant discharged from the chiller 150 may have a temperature within a range of −100° C. to −200° C. The primary coolant discharged from the heat exchanger 121 has a first temperature, and the capturing coolant discharged from the chiller 150 has a second temperature. The absolute value of the second temperature is about 1.2 to 2.0 times (greater than) the absolute value of the first temperature. In other words, the chiller 150 is configured to discharge capturing coolant that is significantly colder than the primary coolant.

Figure 2:
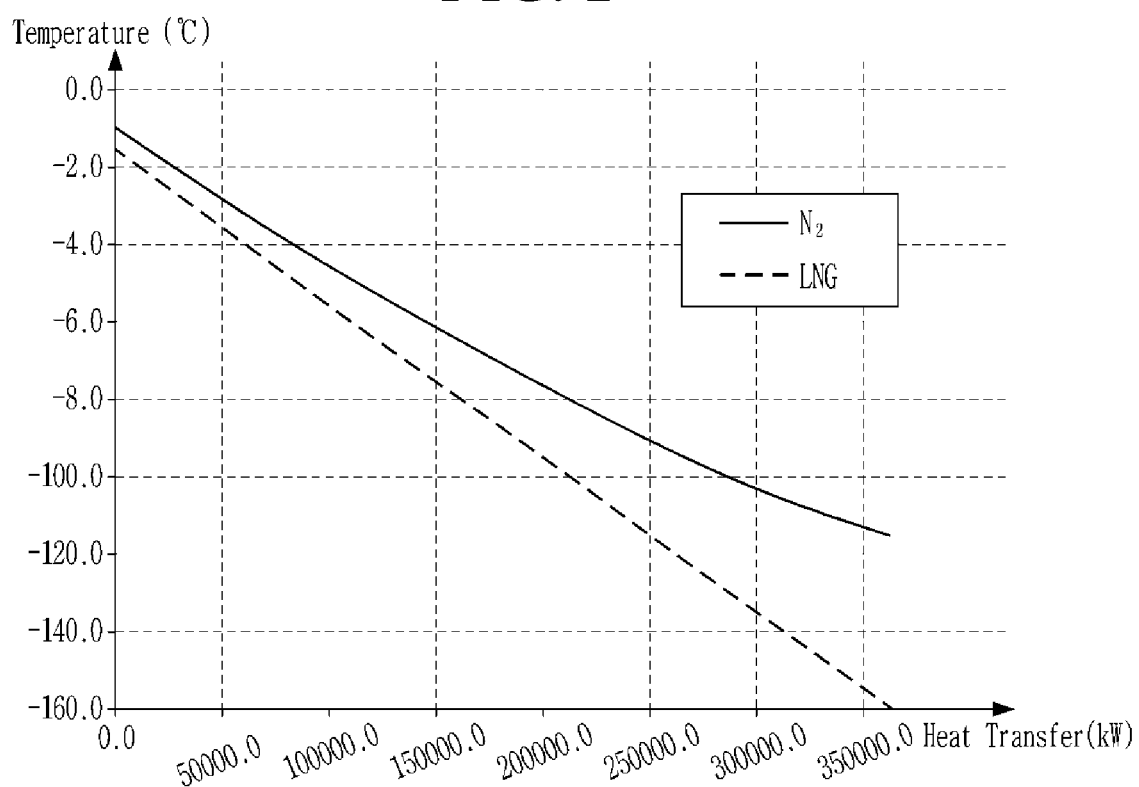
FIG. 2 is a graph illustrating a relationship between a heat transfer rate of nitrogen and temperature.

As illustrated in FIG. 2, for nitrogen serving as a coolant, the triple point occurs at a pressure of 34 bar and a temperature of −147° C., and the specific gravity (Cp) at 0° C. is three times that at −120° C. As such, the physical properties of a coolant dramatically change at cryogenic temperatures. Therefore, it is not easy to lower the temperature of a coolant to the cryogenic temperatures. That is, even if the heat exchanger were to be increased in size, nitrogen cannot be cooled to −150° C., which is the approximate temperature of the cold heat of LNG, and at most can be cooled down to about −120° C. However, in order to capture carbon dioxide, a coolant needs to be cooled to a temperature of about −150° C. To accomplish this, the present disclosure suggests the chiller 150 as configured in the first embodiment of the present invention. That is, with the chiller 150 as in the first embodiment, a coolant can be cooled down to −150° C.

The capturing coolant discharged from the chiller 150 is transferred to the capturing cooler 141 via the second coolant line 124. The capturing cooler 141 is supplied with the capturing coolant from the chiller 150 via the second coolant line 124 and with the flue gas from the gas heater 143 via a second gas line 172. In the capturing cooler 141, heat exchange occurs between the flue gas and the capturing coolant, so that the flue gas is cooled to a temperature range of 0° C. to −150° C. and, more specifically, to a temperature range of −100° C. to −150° C.

Thus, carbon dioxide contained in the flue gas sublimates into a solid and thus separates from the flue gas. Other elements such as nitrogen ($N_2$), oxygen ($O_2$), and argon (Ar) in the flue gas remain as gas. For example, when carbon dioxide in the flue gas accounts for 10% by volume, the carbon dioxide sublimates into a solid at about −100° C. When the flue gas is cooled to −130° C. by the cold heat of the coolant in the capturing cooler, the carbon dioxide is present in an amount of less than 1% in the flue gas. That is, about 96% of removal efficiency of carbon dioxide can be obtained.

When carbon dioxide is present in an amount of about 4% by volume in the flue gas, the carbon dioxide sublimates into a solid at about −110° C. When the flue gas is cooled to −130° C. by passing through the capturing cooler, the carbon dioxide remains in an amount of less than 1% in the flue gas. That is, about 90% of removal efficiency of carbon dioxide can be obtained.

The flue gas discharged from a power station exhibits atmospheric pressure and a temperature of about 100° C. In typical flue gas, the content of carbon dioxide ranges from 4 to 15% and the partial pressure of carbon dioxide ranges from 0.04 to 0.15 atm.

The flue gas is cooled by passing through the gas heater 143 and the capturing cooler 141. The cooled flue gas discharged from the capturing cooler 141 is heated by the gas heater 143 and is then supplied to a purifier or discharged outside.

The gas heater 143 causes heat exchange between the cooled flue gas having a cryogenic temperature discharged from the capturing cooler 141 and a hot flue gas discharged from the power station 110, thereby heating the cooled flue gas discharged from the capturing cooler 141 and cooling the hot flue gas discharged from the power station 110. To this end, the gas heater 143 is connected to a first gas line 171 to which the flue gas discharged from the power station 110 is supplied and a third gas line 174 to which the flue gas discharged from the capturing cooler 141 is supplied.

In order to capture carbon dioxide, the flue gas will be cooled to a temperature range of −100° C. to −150° C. in the capturing cooler 141. However, discharging this cryogenic flue gas directly into the atmosphere could be destructive to surrounding ecological systems. To solve this problem, the flue gas cooled by the capturing cooler 141 is heated by the gas heater 143 before being discharged to the atmosphere.

Meanwhile, the flue gas generated by the power station 110 may have a high temperature in the range of 0 to 100° C. Therefore, this hot flue gas undergoes heat exchange with the cold flue gas discharged from the capturing cooler 141 so as to be cooled to a low temperature in the range of −100 to 0° C., and is then transported to the capturing cooler 141 via a second gas line 172. During this process, moisture contained in the hot flue gas condenses, and thus the gas heater 143 is provided with a water outlet 175 through which the condensate that results from the condensation of the flue gas is discharged outside. The condensate may be ice or water when discharged through a water discharge line 176.

As described above, according to the first embodiment of the present disclosure, the chiller 150 primarily cools the primary coolant using LNG and the primary coolant and the chiller 150 cools the capturing coolant down to cryogenic temperatures, thereby effectively capturing carbon dioxide contained in the flue gas.

Hereinbelow, a carbon dioxide capturing apparatus 101 according to one modification to the first embodiment of the present disclosure will be described with reference to FIG. 3.

Figure 3:
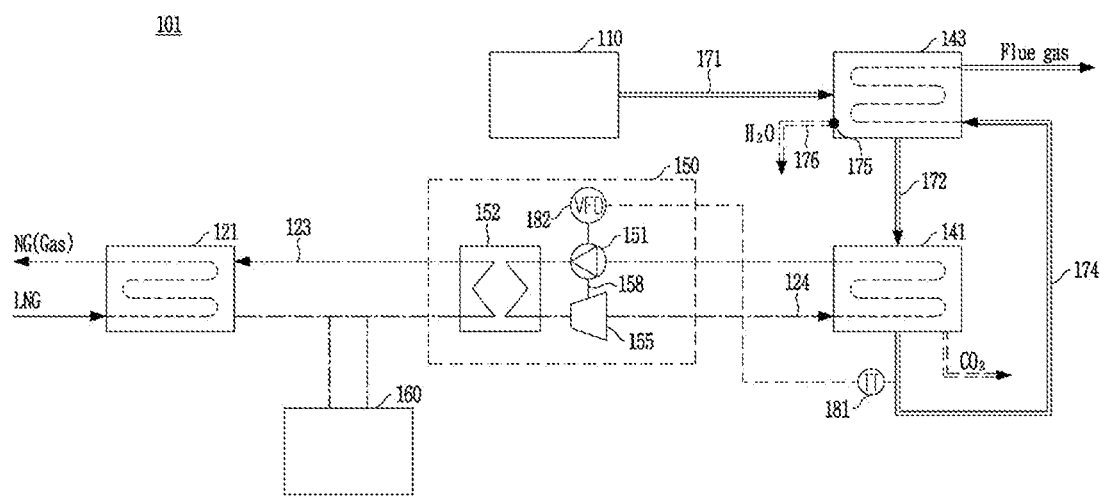
FIG. 3 is a block diagram illustrating a carbon dioxide capturing apparatus using cold heat of liquefied natural gas, according to a modification to the first embodiment.

Referring to FIG. 3, the carbon dioxide capturing apparatus 101 includes an expansion turbine 155 serving as the expansion unit. The expansion turbine 155 expands the capturing coolant so that the temperature of the capturing coolant will be decreased. The expansion turbine 155 may be connected to the compressor 151 and a transfer shaft 158.

Thus, the rotary force of the expansion turbine 155 is transferred to the compressor 151 and thus the compressive force is increased.

Hereinbelow, a carbon dioxide capturing apparatus 200 according to a second embodiment of the present disclosure will be described with reference to FIG. 4.

Figure 4:
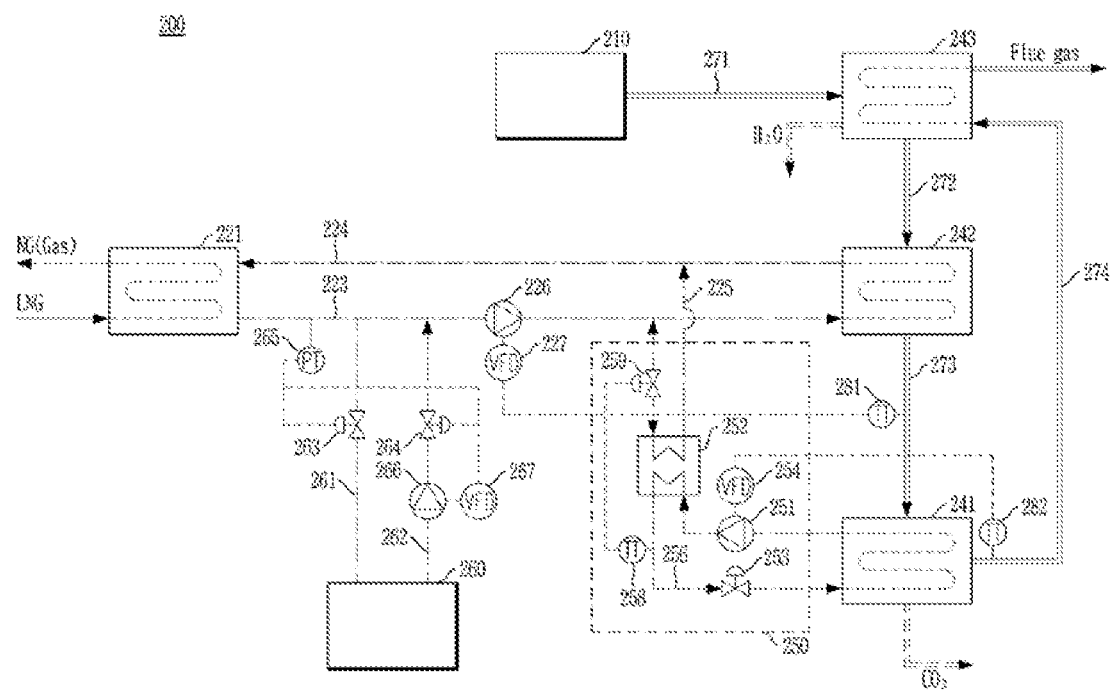
FIG. 4 is a block diagram illustrating a carbon dioxide capturing apparatus using cold heat of liquefied natural gas, according to a second embodiment of the present invention.

Referring to FIG. 4, the carbon dioxide capturing apparatus 200 includes a heat exchanger 221, a chiller 250, a capturing cooler 241, a gas cooler 242, a gas heater 243, and a storage unit 260.

In the apparatus of FIG. 4, a primary coolant and a capturing coolant may each be nitrogen, or may each include any one selected from the group consisting of nitrogen, argon, helium, and carbon dioxide. Furthermore, each of the primary coolant and the capturing coolant may include at least one selected from the group consisting of R14 ($CF_4$), R22 ($CHClF_2$), R23 ($CHF_3$), R116 ($C_2F_2$), and R218 ($C_3F_8$). The primary coolant and the capturing coolant may be the same material or different materials.

The heat exchanger 221 cools the primary coolant with liquefied natural gas (LNG) and the LNG is regasified in the heat exchanger 221. However, the present invention is not limited thereto. The LNG may not be phase-changed into gas in the heat exchanger 221 and may simply be heated, that is, without involving a phase change.

The heat exchanger 221 is connected to a coolant supply line 223 for transporting the primary coolant discharged from the heat exchanger 221 to the gas cooler 242 and to a coolant recovery line 224 for transporting the primary coolant discharged from the gas cooler 224 to the heat exchanger 221. The coolant supply line 223 and the coolant recovery line 224 are connected to a first heat transfer line 225 for supplying cold heat to the chiller 250.

The first heat transfer line 225 receives the primary coolant from the coolant supply line 223. Then, the first heat transfer line 225 transfers the cold heat to the chiller 250 and then transports the primary coolant to the coolant recovery line 224. Therefore, a portion of the primary coolant discharged from the heat exchanger 221 transfers its cold heat to the chiller 250, and the remainder transfers its cold heat to the gas cooler 242.

When the supply of LNG is stopped or interrupted, the temperature of the primary coolant rises and the volume of the primary coolant increases, resulting in a considerable increase in the internal pressure of the coolant supply line 223. In order to address this issue, the coolant supply line 223 may be connected to the storage unit 260.

That is, when the pressure of the coolant supply line 223 rises to exceed a reference pressure, the coolant flows from the coolant supply line 223 to be stored in the storage unit 260. On the contrary, when the pressure of the coolant supply line 223 is lower than the reference pressure, the coolant flows into the coolant supply line 223 from the storage unit 260. To this end, a coolant dumping line 261 and a coolant control line 262 may be connected between the storage unit 260 and the coolant supply line 223.

The coolant dumping line 261 may be provided with a first valve 263 for regulating the flow rate of the primary coolant flowing from the coolant supply line 223 to the storage unit 260, and the coolant control line 262 may be provided with a second valve 264 and a first control pump 266 for regulating the flow rate of the primary coolant flowing from the storage unit 260 to the coolant supply line 223.

The coolant supply line 223 may be provided with a pressure sensor 265. If the temperature of the coolant rises for some reason, such as the supply of LNG being stopped or interrupted such that the internal pressure of the coolant supply line 223 rises to exceed a critical pressure, the first valve 263 is opened so that the coolant can move to the storage unit 260 and, as a result, the internal pressure of the coolant supply line 223 is reduced. On the contrary, when the internal pressure of the coolant supply line 223 is lower than the critical pressure, the second valve 264 is opened and the first control pump 266 is activated by a pump control unit 267 so that the coolant may be supplied to the coolant supply line 223 from the storage unit 260.

The chiller 250 is connected to the first heat transfer line 225 and a chilling line 256. The chilling line 256 is connected to the chiller 250 and the capturing cooler 241, thereby transporting the capturing coolant. The chiller 250 may include a compressor 251 connected to the chilling line 256 and configured to compress the capturing coolant, a condenser 252 for cooling the compressed capturing coolant, and an expansion unit for expanding the condensed capturing coolant. Here, the expansion unit may be configured as an expansion valve 253.

The chilling line 256 may be provided with the temperature sensor 258 for measuring the temperature of the capturing coolant discharged from the chiller 250, and the first heat transfer line 225 may be provided with a flow control valve 259 for regulating the flow rate of the primary coolant flowing along the first heat transfer line 225. The flow control valve 259 is connected to the temperature sensor 258, thereby receiving temperature information from the temperature sensor 258. When the temperature measured by the temperature sensor 258 is higher than a reference temperature, the flow control valve 259 increases the flow rate of the primary coolant. On the contrary, when the temperature measured by the temperature sensor 258 is lower than the reference temperature, the flow control valve 259 decreases the flow rate of the primary coolant.

The condenser 252 cools the capturing coolant flowing along the chilling line 256 by using the heat exchange between the first heat transfer line 225 and the chilling line 256. The condenser 252 is installed between the compressor 251 and the expansion valve 253. The compressor 251 compresses the capturing coolant and, through this compression, the temperature of the capturing coolant rises. The compressed capturing coolant having an increased temperature is cooled by the condenser 252 and is then transported to the expansion valve 253. The compressed capturing coolant expands after passing the expansion valve 253, resulting in the capturing coolant having an increased volume and a decreased temperature. This cooled capturing coolant is transported to the capturing cooler 241.

The carbon dioxide capturing apparatus 200 according to the second embodiment of the present disclosure may further include a first temperature sensor 282 for measuring the temperature of the flue gas discharged from the capturing cooler 241 and a first compression control unit 254 for controlling the compressor 251 according to the information received from the first temperature sensor 282. The first compression control unit 254 may be configured with a variable frequency drive (VFD). The first compression control unit 254 controls the compressor 251 to increase the compression ratio when the temperature of the flue gas is higher than a reference temperature that is preset and to decrease the compression ratio when the temperature of the flue gas is lower than the reference temperature.

The capturing coolant discharged from the chiller 250 may have a temperature within a range of −100° C. to −200° C. The primary coolant discharged from the heat exchanger 221 has a first temperature, and the capturing coolant discharged from the chiller 250 has a second temperature. The absolute value of the second temperature is about 1.2 to 2.0 times (greater than) the absolute value of the first temperature.

Hereinafter, the flow of the flue gas will be mainly described.

The flue gas discharged from a power station 210 exhibits atmospheric pressure and a temperature of about 100° C. In typical flue gas, the content of carbon dioxide ranges from 4 to 15% and the partial pressure of carbon dioxide ranges from 0.04 to 0.15 atm. The flue gas is cooled by passing through the gas heater 243, the gas cooler 242, and the capturing cooler 241. The cooled flue gas discharged from the capturing cooler 241 is heated by the gas heater 143 and is then supplied to a purifier or discharged outside.

The gas heater 243 causes heat exchange between the cooled flue gas having a cryogenic temperature discharged from the capturing cooler 241 and a hot flue gas discharged from the power station 210, thereby heating the cooled flue gas discharged from the capturing cooler 241 and cooling the hot flue gas discharged from the power station 210. To this end, the gas heater 243 is connected to a first gas line 271 to which the flue gas discharged from the power station 210 is supplied and a fourth gas line 274 to which the flue gas discharged from the capturing cooler 241 is supplied.

The flue gas cooled in the gas heater 243 is supplied to the gas cooler 242 via the second gas line 172, and the gas cooler 242 cools the flue gas which has been primarily cooled in the gas heater 243, using the primary coolant transferred from the heat exchanger 221. Therefore, the flue gas may be cooled in the gas cooler 242 before being introduced into the capturing cooler 241.

The gas cooler 242 is connected to the coolant supply line 223 and the coolant recovery line 224. The flue gas is secondarily cooled to a temperature range of −100 to 0° C. in the gas cooler 242. The flue gas cooled in the gas cooler 242 is transported to the capturing cooler 241 via a third gas line 273.

The carbon dioxide capturing apparatus 200 may further include a main compressor 226 installed on the coolant supply line 223 and configured to control the movement of the primary coolant, a main temperature sensor 281 for measuring the temperature of the flue gas discharged from the gas cooler 242, and a main compression control unit 227 for controlling the operation of the main compressor 226 according to information transmitted by the main temperature sensor 281.

The main compression control unit 227 may be configured with a variable frequency drive (VFD). The main compression control unit 227 controls the main compressor 226 to increase the compression ratio when the temperature of the flue gas is higher than a reference temperature that is preset and to decrease the compression ratio when the temperature of the flue gas is lower than the reference temperature.

The capturing coolant discharged from the chiller 250 is transported to the capturing cooler 241 via the chilling line 256. The capturing cooler 241 receives the flue gas from the gas cooler 242 via the third gas line 273. In the capturing cooler 241, heat exchange occurs between the flue gas and the capturing coolant, so that the flue gas is cooled to a temperature range of 0° C. to −150° C. and, more specifically, to a temperature range of −100° C. to −150° C.

Thus, carbon dioxide contained in the flue gas sublimates into a solid and thus separates from the flue gas. Other elements such as nitrogen ($N_2$), oxygen ($O_2$), and argon (Ar) in the flue gas remain as gas.

As described above, according to the second embodiment, since the gas cooler 242 is added to the configuration of the first embodiment, the flue gas is cooled via three cooling stages which respectively correspond to the gas heater 243, the gas cooler 242, and the capturing cooler 241. Furthermore, due to the capturing coolant that is secondarily cooled by the chiller 250, the carbon dioxide capturing efficiency is increased.

Hereinbelow, a carbon dioxide capturing apparatus 201 according to one modification to the second embodiment of the present disclosure will be described with reference to FIG. 5.

Figure 5:
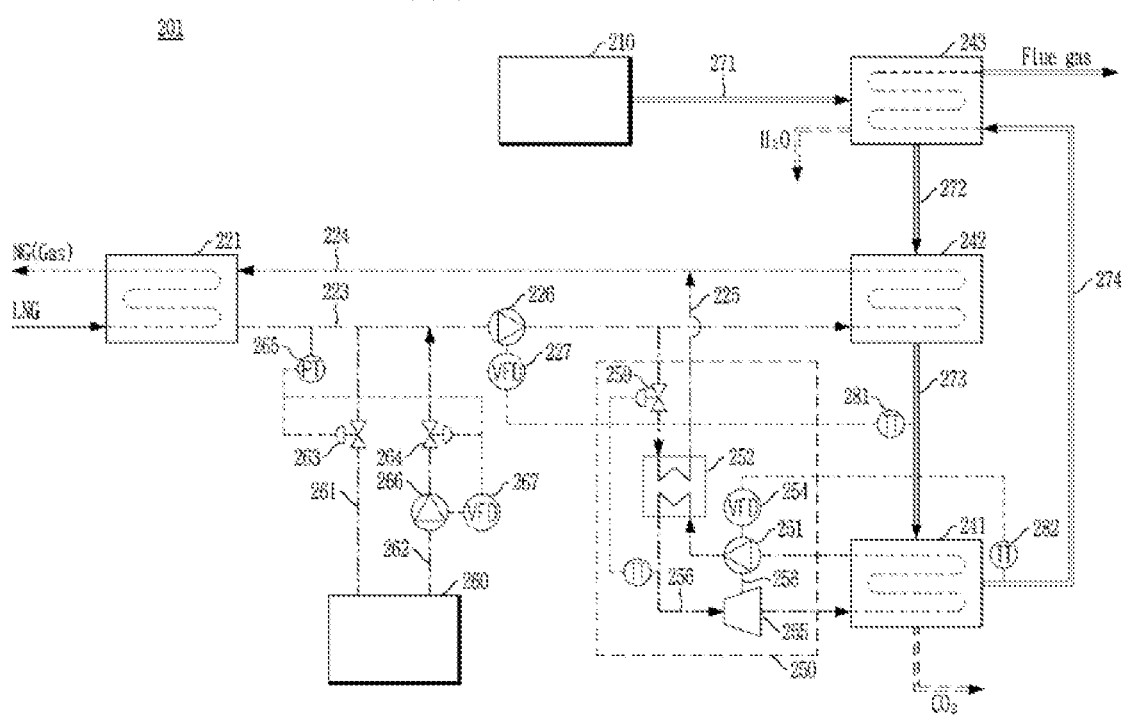
FIG. 5 is a block diagram illustrating a carbon dioxide capturing apparatus using cold heat of liquefied natural gas, according to a modification to the second embodiment of the present invention.

Referring to FIG. 5, the carbon dioxide capturing apparatus 201 includes an expansion turbine 255 serving as the expansion unit. The expansion turbine 255 expands the capturing coolant so that the temperature of the capturing coolant will be decreased. The expansion turbine 255 may be connected to the compressor 251 and a transfer shaft 258. Thus, the rotary force of the expansion turbine 255 is transferred to the compressor 251 and thus the compressive force is increased.

Hereinbelow, a carbon dioxide capturing apparatus 300 according to a third embodiment of the present invention will be described with reference to FIG. 6. Except for the configuration relative to a chiller 350, the carbon dioxide capturing apparatus 300 has the same structure as the carbon dioxide capturing apparatus (200, 201) of the second embodiment. Therefore, duplicate description of corresponding components will be omitted.

Figure 6:
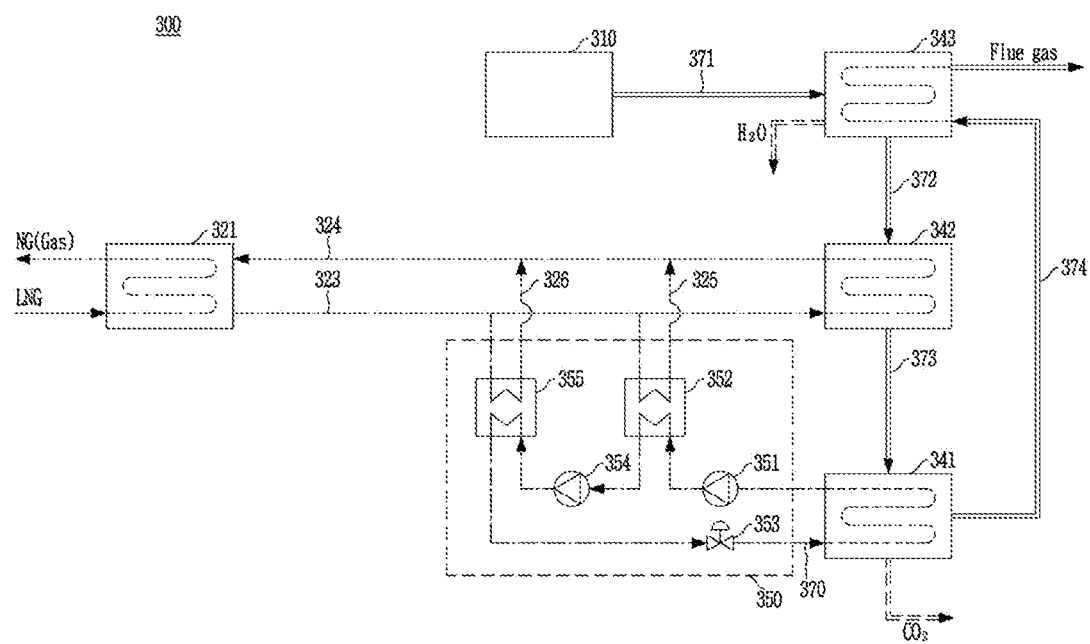
FIG. 6 is a block diagram illustrating a carbon dioxide capturing apparatus using cold heat of liquefied natural gas, according to a third embodiment of the present invention.

Referring to FIG. 6, the carbon dioxide capturing apparatus 300 includes a heat exchanger 321, the chiller 350, a capturing cooler 341, a gas cooler 342, and a gas heater 243.

The heat exchanger 321 is connected to a coolant supply line 323 for transporting primary coolant discharged from the heat exchanger 321 to the gas cooler 342 and to a coolant recovery line 324 for transporting the primary coolant discharged from the gas cooler 342 to the heat exchanger 321. The coolant supply line 323 and the coolant recovery line 324 are connected to a first heat transfer line 325 and a second heat transfer line 326, respectively, for supplying cold heat to the chiller 350.

The chiller 350 is connected to the first heat transfer line 325, the second heat transfer line 326, and a chilling line 370. The chilling line 370 is connected between the chiller 350 and the capturing cooler 341, thereby transporting the capturing coolant. The chiller 350 includes a first compressor 351 connected to the chilling line 370 and configured to compress the capturing coolant, a first condenser 352 for cooling the compressed capturing coolant, a second compressor 354 for compressing the condensed capturing coolant, a second condenser 355 for condensing the capturing coolant compressed by the second compressor 354, and an expansion unit for expanding the capturing coolant discharged from the second condenser 355. Here, the expansion unit may be configured as an expansion valve 353.

The first heat transfer line 325 receives primary coolant from a coolant supply line 323 and transfers cold heat to the chiller 350. The first heat transfer line 325 then transfers the primary coolant to a coolant recovery line 324. The first condenser 352 cools the capturing coolant flowing along the chilling line 370 by causing the heat exchange between the first heat transfer line 325 and the chilling line 370. The first condenser 352 is installed between the first compressor 351 and the second compressor 354.

The second heat transfer line 326 receives the primary coolant from the coolant supply line 323 and transfers cold heat to the chiller 350. The second heat transfer line 326 then transfers the first coolant to the coolant recovery line 324. The second condenser 355 cools the capturing coolant flowing out through the chilling line 370 by causing heat exchange between the second heat transfer line 326 and the chilling line 370 internal to the chiller 350. The second condenser 352 is installed between the second compressor 354 and the expansion valve 353.

The gas heater 343 causes heat exchange between the cooled flue gas having a cryogenic temperature discharged from the capturing cooler 341 and a hot flue gas discharged from a power station 310, thereby heating the cooled flue gas discharged from the capturing cooler 341 and cooling the hot flue gas discharged from the power station 310. To this end, the gas heater 343 is connected to a first gas line 371 and a fourth gas line 374. The flue gas cooled in the gas heater 343 is transported to the gas cooler 342 via the second gas line 372.

The gas cooler 342 is connected to the coolant supply line 323 and the coolant recovery line 324. The flue gas cooled in the gas cooler 342 is transported to the capturing cooler 341 via a third gas line 373.

The capturing coolant discharged from the chiller 350 is transported to the capturing cooler 341 via the chilling line 370. In the capturing cooler 341, the flue gas may be cooled to a cryogenic temperature through heat exchange with the capturing coolant, so that the carbon dioxide contained in the flue gas sublimates into a solid and separates from the flue gas.

As described above, according to the third embodiment, since the capturing coolant undergoes two cycles of compression and condensation in the chiller 350, the capturing coolant can be cooled more easily to a cryogenic temperature.

Hereinbelow, a carbon dioxide capturing apparatus 400 according to a fourth embodiment of the present invention will be described with reference to FIG. 7. Except for the configuration relative to a chiller 450, the carbon dioxide capturing apparatus 400 has the same structure as the carbon dioxide capturing apparatus (200, 201) according to the second embodiment. Therefore, duplicate description of corresponding components will be omitted.

Figure 7:
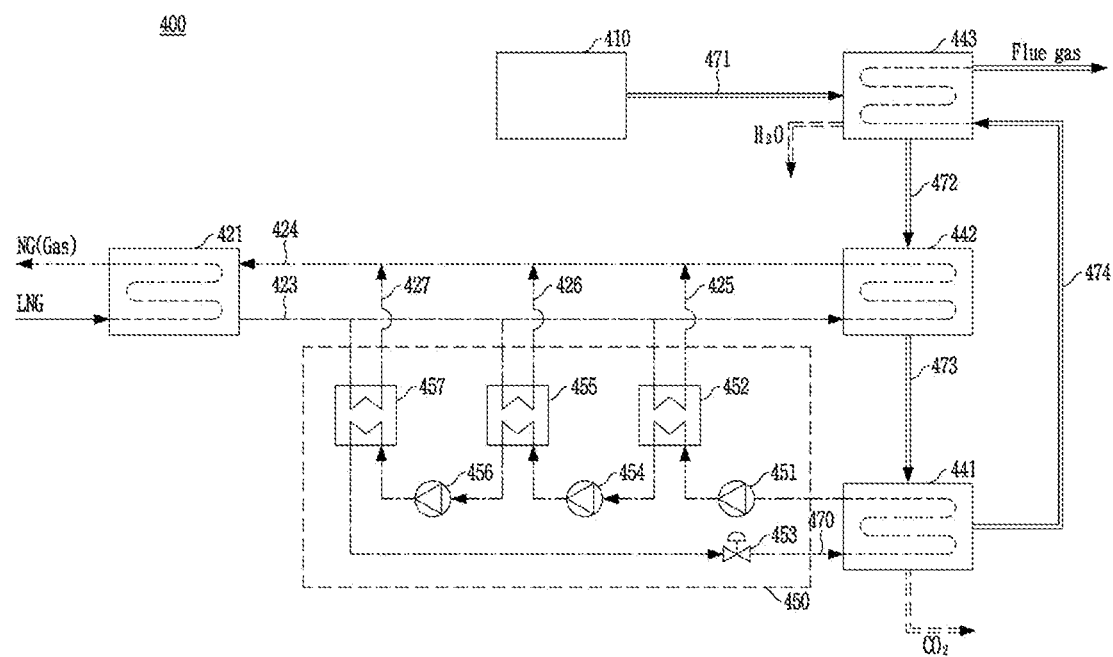
FIG. 7 is a block diagram illustrating a carbon dioxide capturing apparatus using cold heat of liquefied natural gas, according to a fourth embodiment of the present invention.

Referring to FIG. 7, the carbon dioxide capturing apparatus 400 includes a heat exchanger 421, the chiller 450, a capturing cooler 441, a gas cooler 442, and a gas heater 443.

The heat exchanger 421 is connected to a coolant supply line 423 for transporting primary coolant discharged from the heat exchanger 421 to the gas cooler 442 and to a coolant recovery line 424 for transporting the primary coolant discharged from the gas cooler 442 to the heat exchanger 421. The coolant supply line 423 and the coolant recovery line 424 are connected to a first heat transfer line 425, a second heat transfer line 426, and a third heat transfer line 427 each for supplying cold heat to the chiller 450.

The chiller 450 is connected to the first heat transfer line 425, the second heat transfer line 426, the third heat transfer line 427, and a chilling line 470. The chilling line 470 is connected between the chiller 450 and the capturing cooler 441, thereby transporting capturing coolant. The chiller 450 includes a first compressor 451 connected to the chilling line 470 and configured to compress the capturing coolant, a first condenser 452 for cooling the compressed capturing coolant, a second compressor 454 for compressing the condensed capturing coolant, a second condenser 455 for condensing the capturing coolant compressed by the second compressor 454, a third compressor 456 for compressing condensed by the second condenser 455, a third condenser 457 for condensing the capturing coolant compressed by the third compressor 456, and an expansion unit for expanding the capturing coolant discharged from the third condenser 457. Here, the expansion unit may be configured as an expansion valve 453.

The first heat transfer line 425, the second heat transfer line 426, and the third heat transfer line 427 receives primary coolant from a coolant supply line 423, transfers cold heat to the chiller 450, and transfers the primary coolant to a coolant recovery line 424. The first condenser 452 cools the capturing coolant flowing along the chilling line 470, by causing heat exchange between the first heat transfer line 425 and the chilling line 470, and is installed between the first compressor 451 and the second compressor 454. The second condenser 455 cools the capturing coolant flowing out through the chilling line 470, by causing the heat exchange between the second heat transfer line 426 and the chilling line 470 internal to the chiller 450, and is installed between the second compressor 454 and the third compressor 456. The third condenser 457 cools the capturing coolant flowing along the chilling line 470, by causing heat exchange between the third heat transfer line 427 and the chilling line 470, and is installed between the third compressor 456 and the expansion valve 453.

The gas heater 443 causes heat exchange between the cooled flue gas having a cryogenic temperature discharged from the capturing cooler 441 and a hot flue gas discharged from a power station 410, thereby heating the cooled flue gas discharged from the capturing cooler 441 and cooling the hot flue gas discharged from the power station 410. To this end, the gas heater 443 is connected to a first gas line 471 and a fourth gas line 474. The flue gas cooled in the gas heater 443 is transported to the gas cooler 442 via the second gas line 472.

The gas cooler 442 is connected to the coolant supply line 423 and the coolant recovery line 424. The flue gas cooled in the gas cooler 442 may be transported to the capturing cooler 441 via a third gas line 473.

The capturing coolant discharged from the chiller 450 is transported to the capturing cooler 441 via the chilling line 470. In the capturing cooler 441, the flue gas may be cooled to a cryogenic temperature through heat exchange with the capturing coolant, so that the carbon dioxide contained in the flue gas sublimates into a solid and separates from the flue gas.

As described above, according to the fourth embodiment, since the capturing coolant undergoes three cycles of compression and condensation in the chiller 450, the capturing coolant can be cooled more easily to a cryogenic temperature.

Hereinbelow, a carbon dioxide capturing apparatus 500 according to a fifth embodiment of the present invention will be described with reference to FIG. 8. Except for the configuration relative to a chiller 550, the carbon dioxide capturing apparatus 500 has the same structure as the carbon dioxide capturing apparatus (100, 101) according to the first embodiment. Therefore, duplicate description of corresponding components will be omitted.

Figure 8:
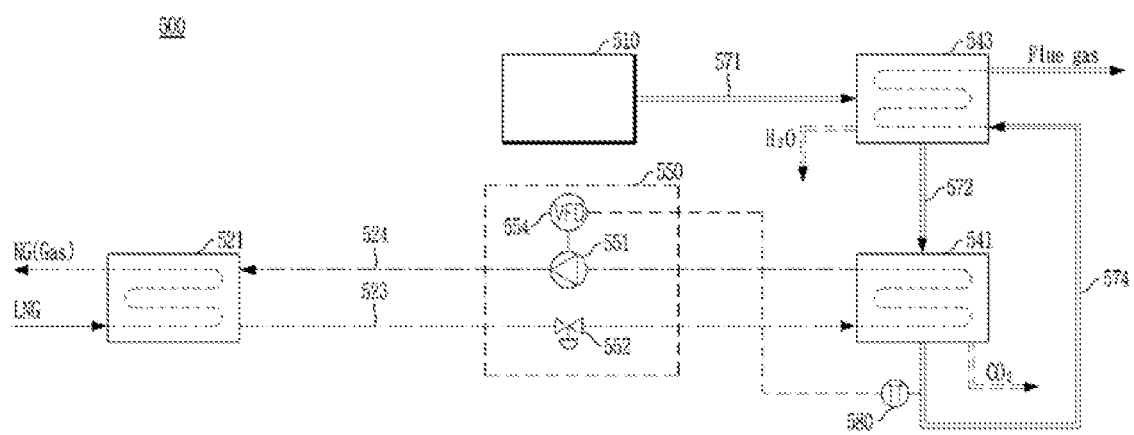
FIG. 8 is a block diagram illustrating a carbon dioxide capturing apparatus using cold heat of liquefied natural gas, according to a fifth embodiment of the present invention.

Referring to FIG. 8, the carbon dioxide capturing apparatus 500 includes a heat exchanger 521, the chiller 550, a capturing cooler 541, and a gas heater 543.

The heat exchanger 521 cools coolant with liquefied natural gas (LNG) and the LNG is regasified in the heat exchanger 521. The heat exchanger 521 is connected to a coolant supply line 523 for transporting the coolant discharged from the heat exchanger 521 to the gas cooler 541 and to a coolant recovery line 524 for transporting the coolant discharged from the gas cooler 541 to the heat exchanger 521.

The chiller 550 is connected to the coolant supply line 523 and the coolant recovery line 524 and is disposed between the heat exchanger 521 and the collecting cooler 541. The chiller 550 includes a compressor 551 installed on the coolant supply line 523 and an expansion unit 552 installed on the coolant recovery line 524.

The compressor 551 is installed on the coolant supply line 523, compresses the coolant discharged from the capturing cooler 541, and transfers the compressed coolant to the heat exchanger 521. The expansion unit 552 is installed on the coolant recovery line 524 to expand the coolant discharged from the heat exchanger 521 to lower the temperature of the coolant, thereby converting the coolant into capturing coolant and then supplying the capturing coolant to the capturing cooler 541. The expansion unit 552 may be configured with an expansion valve or an expansion turbine.

According to the fifth embodiment, the primary coolant is compressed by the compressor 551, is condensed by cold heat of liquefied natural gas in the heat exchanger 521, is expanded in the expansion unit 552 so as to be converted into the capturing coolant having a cryogenic temperature, and is supplied to the capturing cooler 541.

The carbon dioxide capturing apparatus 500 according to the fifth embodiment of the present invention may further include a temperature sensor 580 for measuring the temperature of the flue gas discharged from the capturing cooler 541 and a compression control unit 554 for controlling the compressor 551 according to information transmitted from the temperature sensor 580. The compression control unit 554 may be configured with a variable frequency drive (VFD). The compression control unit 554 controls the compressor 551 to increase the compression ratio when the temperature of the flue gas is higher than a reference temperature that is preset and to decrease the compression ratio when the temperature of the flue gas is lower than the reference temperature.

The coolant discharged from the chiller 550 via the coolant supply line 523 may be at a temperature in the range of −100 to −200° C. The coolant discharged from the heat exchanger 521 has a first temperature and the coolant discharged from the chiller 550 has a second temperature. The absolute value of the second temperature is about 1.2 to 2.0 times (greater than) the absolute value of the first temperature.

The capturing cooler 541 receives the coolant from the chiller 550 and receives the flue gas from the gas heater 543 via the second gas line 572. In the capturing cooler 541, the flue gas may be cooled through the heat exchange with the coolant, so that the carbon dioxide contained in the flue gas sublimates into a solid state and separates from the flue gas.

The gas heater 543 causes heat exchange between the cooled flue gas having a cryogenic temperature discharged from the capturing cooler 541 and a hot flue gas discharged from a power station 510, thereby heating the cooled flue gas discharged from the capturing cooler 541 and cooling the hot flue gas discharged from the power station 510. To this end, the gas heater 543 is connected to a first gas line 571 to which the flue gas discharged from the power station 510 is supplied and a third gas line 574 to which the flue gas having a relatively low temperature discharged from the capturing cooler 541 is supplied. The gas heater 543 may be connected to a second gas line 572 for supplying a flue gas to the capturing cooler 541.

As described above, according to the fifth embodiment, since the chiller 550 directly secondarily cools the coolant cooled by the heat exchanger 521, the coolant can be cooled to a very low temperature, thereby efficiently capturing the carbon dioxide contained in the flue gas.

Hereinbelow, a carbon dioxide capturing apparatus 600 according to a sixth embodiment of the present disclosure will be described with reference to FIG. 9.

Figure 9:
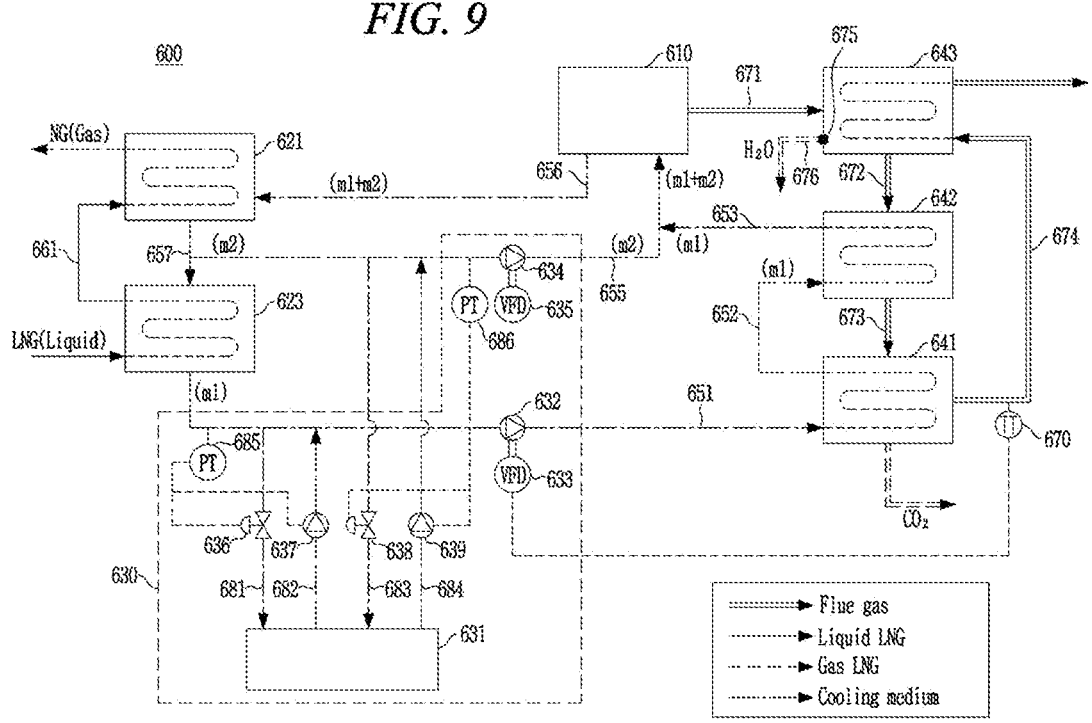
FIG. 9 is a block diagram of a carbon dioxide capturing apparatus using cold heat of liquefied natural gas, according to a sixth embodiment of the present invention.

Referring to FIG. 9, the carbon dioxide capturing apparatus 600 includes a heat exchanger 621, a chiller 623, a capturing cooler 641, a gas cooler 642, a gas heater 643, a control unit 630, and a bypass line 655.

Primary coolant is primarily cooled in the heat exchanger 621 and the cooled primary coolant is divided into two streams. A first stream of the primary coolant flows into the chiller 523 at a first flow rate m1, is then cooled in the chiller 623 to be converted into capturing coolant, and is then introduced into the capturing cooler 641 and the gas cooler 642. A second stream of the primary coolant flows into the bypass line 655 at a second flow rate m2. The first stream and the second stream merge in the bypass line 655, and the merged stream is heated in a power station 610 and then returns to the heat exchanger 621. In this way, the primary coolant circulates.

The heat exchanger 621 cools the primary coolant with liquefied natural gas (LNG) and the LNG is regasified in the heat exchanger 621. In the present disclosure, the term "to regasify" not only means to turn a liquid natural gas back into a gaseous natural gas but also means to simply increase the temperature of the liquid natural gas without involving a phase change from liquid to gas.

The coolant discharged from a heat source such as a power generation facility 610 flows into the heat exchanger 621 via a first coolant transfer line 656 and a portion of the primary coolant is supplied to the chiller 623 via a second coolant transfer line 657. The bypass line 655 is connected to the second coolant transfer line 657. The bypass line 655 transfers a portion of the coolant discharged from the heat exchanger 621 to the heat source. Here, the heat source may be the power generation facility 610. However, the present invention is not limited thereto. That is, the bypass line 655 may be directly connected to the heat exchanger 621 and the heat source may be various equipment discharging combustion gas.

The coolant discharged through the bypass line 655 is supplied to the condenser of the power generation facility together with the coolant discharged from the gas cooler 642 to be used for heat dissipation of the power generation facility, thereby gaining heat from the power generation facility, and is then supplied back to the heat exchanger 621.

When the coolant is not sufficiently heated, the liquefied natural gas (LNG) may not be regasified. However, when the coolant flowing along the bypass line and the coolant used to capture carbon dioxide are used for heat dissipation of the power generation facility 610 as disclosed in the sixth embodiment, the coolant can be sufficiently heated. Therefore, the regasification of the LNG has not failed. That is, the LNG (liquid phase) can turn into natural gas (gaseous phase).

The primary coolant discharged from the heat exchanger 621 has a first temperature that is within the range of −30 to −150° C., and preferably the range of −60 to −100° C. The primary coolant discharged from the heat exchanger 621 may have a pressure of 50 to 200 bar. The flow rate m2 of the second stream of the coolant flowing through the bypass line 655 may be 40 to 70 wt % with respect to the flow rate (m1+m2) of the coolant flowing into the heat exchanger 621.

The chiller 623 uses liquefied natural gas to secondarily cool the coolant to generate the capturing coolant, and the chiller 623 is supplied with liquefied natural gas from the LNG storage facility. The liquefied natural gas has a temperature of about −150° C. to about −162° C. and a pressure of 100 bar, is first heated while cooling the coolant in the chiller 623, is then regasified while cooling the coolant in the heat exchanger 621, and is finally supplied to consumers or industrial equipment.

The chiller 623 receives the coolant from the heat exchanger 621 through the second coolant transfer line 657. The first flow rate m1 of the coolant flowing into the chiller 623 is 0.4 to 1.5 times (greater than) the second flow rate m2 of the coolant flowing into the bypass line 655.

The capturing coolant discharged from the chiller 623 has a second temperature that is within the range of −100° C. to −200° C., and preferably the range of −120° C. to −150° C. Here, the second temperature has a value lower than the first temperature, in which the absolute value of the second temperature is 1.4 to 2.5 times (greater than) the absolute value of the first temperature.

A first natural gas line 661 for transferring the liquefied natural gas discharged from the chiller 623 to the heat exchanger 621 is connected to the heat exchanger 621 and the chiller 623. The liquefied natural gas that is heated in a process of cooling the coolant is supplied to the heat exchanger 621 through the first natural gas line 661.

Figure 10:
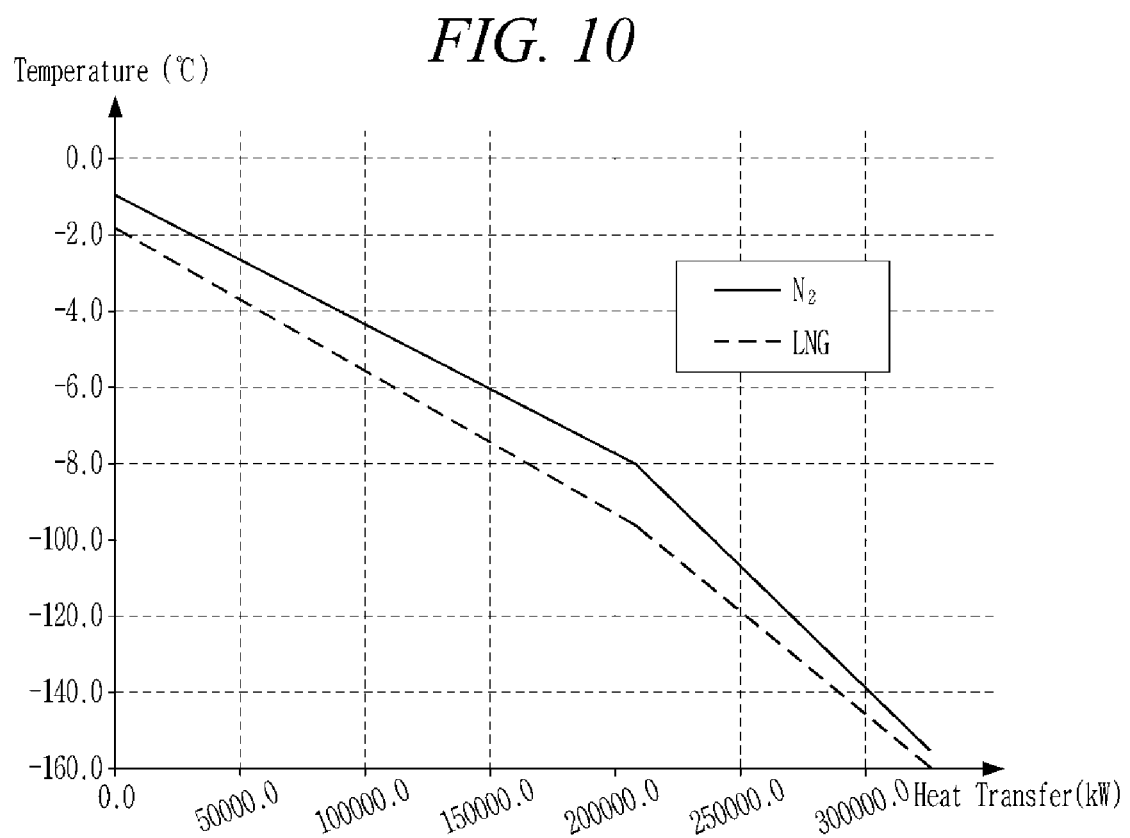
FIG. 10 is a graph illustrating a relationship between the temperature of a coolant and a heat transfer rate, according to the sixth embodiment of the present invention.

As illustrated in FIG. 10, according to the sixth embodiment, a portion of nitrogen is controlled to bypass the chiller so that the remaining nitrogen can be easily cooled to a cryogenic state of −150° C.

A first coolant line 651 is connected to the chiller 623 and the capturing cooler 641 to transfer the coolant discharged from the chiller 623 to the capturing cooler 641. The coolant flows from the capturing cooler 641 to the gas cooler 642 to cool the flue gas, and then joins at the bypass line 655.

Hereinafter, the flow of the flue gas will be mainly described.

The flue gas discharged from a power station exhibits atmospheric pressure and a temperature of about 100° C. In typical flue gas, the content of carbon dioxide ranges from 4 to 15% and the partial pressure of carbon dioxide ranges from 0.04 to 0.15 atm.

The flue gas passes through the gas heater 643, the gas cooler 642, and the capturing cooler 641 to be cooled. The cooled flue gas discharged from the capturing cooler 641 is heated by the gas heater 143 and is then supplied to a purifier or discharged outside.

The gas heater 643 causes heat exchange between the cooled flue gas having a cryogenic temperature discharged from the capturing cooler 641 and a hot flue gas discharged from a power station 610, thereby heating the cooled flue gas discharged from the capturing cooler 641 and cooling the hot flue gas discharged from the power station 610. To this end, the gas heater 643 is connected to a first gas line 671 to which the flue gas discharged from the power station 610 is supplied and a fourth gas line 674 to which the flue gas discharged from the capturing cooler 641 is supplied.

In order to capture carbon dioxide, the flue gas will be cooled to a temperature range of −100° C. to −150° C. in the capturing cooler 641. However, discharging this cryogenic flue gas directly into the atmosphere could be destructive to surrounding ecological systems. To solve this problem, the flue gas cooled by the capturing cooler 641 is heated by the gas heater 643 before being discharged to the atmosphere.

Meanwhile, the flue gas generated by the power station 610 may have high temperatures ranging from 0 to 100° C. Therefore, this hot flue gas is cooled to low temperatures ranging from −100 to 0° C. by undergoing heat exchange with the cold flue gas discharged from the capturing cooler 641. That is, the flue gas discharged from the power station 610 is discharged outside after being cooled to temperatures ranging from −100° C. to 0° C. During this process, water contained in the hot flue gas condenses, and thus the gas heater 643 is provided with a water outlet 675 through which the condensate generated due to condensation of the flue gas discharged from the power station is discharged outside. The condensate may be ice or water when it is discharged through a water discharge line 676. Thus, the gas heater 643 is provided with a water discharge portion (675, 676) for discharging condensate generated through condensation of the flue gas discharged from a heat source, i.e., the power station 610. By removing moisture contained in the flue gas in that way, it is possible to reduce white smoke when the flue gas is discharged to the atmosphere.

The flue gas cooled in the gas heater 643 is supplied to the gas cooler 642 via the second gas line 172, and the gas cooler 642 cools the flue gas which has been primarily cooled in the gas heater 643, using the coolant transferred from the capturing cooler 641. Therefore, the flue gas may be cooled in the gas cooler 642 before being introduced into the capturing cooler 641.

The gas cooler 642 is connected to a second coolant line 652 for transferring the coolant discharged from the capturing cooler 641 to the gas cooler 642 and to a third coolant line 653 that is connected between the gas cooler 642 and the bypass line 655 to transfer the coolant discharged from the gas cooler 642 to the bypass line 655. The flue gas is secondarily cooled to a temperature range of −100 to 0° C. in the gas cooler 642. The flue gas cooled in the gas cooler 642 can be transferred to the capturing cooler 641 via a third gas line 673.

The capturing cooler 641 is supplied with the coolant from the chiller 623 via the first coolant line 651 and with the flue gas from the gas cooler 642 via the third gas line 673. In the capturing cooler 641, heat exchange occurs between the flue gas and the coolant, so that the flue gas may be cooled to a temperature range of 0° C. to −150° C. and, more specifically, to a temperature range of −100° C. to −150° C.

Thus, carbon dioxide contained in the flue gas sublimates into a solid and thus separates from the flue gas. Other elements such as $N_2$, $O_2$, and Ar in the flue gas remain as gas. Carbon dioxide may be separated from the flue gas and then discharged as a liquid.

For example, when carbon dioxide is present in an amount of 10% by volume in the flue gas, the carbon dioxide starts sublimating into a solid at a temperature of about −100° C. When the flue gas is cooled to −130° C. by the cold heat of the coolant in the capturing cooler 641, the carbon dioxide is present in an amount of less than 1% in the flue gas. Therefore, the removal efficiency of carbon dioxide becomes 90% or more, and theoretically 96% of carbon dioxide can be removed.

When carbon dioxide is present in an amount of about 4% by volume in the flue gas, the carbon dioxide starts sublimating into a solid at a temperature of about −110° C. When the flue gas passes through the capturing cooler to be cooled to −130° C., the carbon dioxide is present only in an amount of less than 1% in the flue gas. Therefore, the removal efficiency of carbon dioxide is about 70% or more.

Hereinafter, the control of the first coolant line 651 and the bypass line 655 in which the coolant moves will be described.

The carbon dioxide capturing apparatus 600 according to the sixth embodiment further includes a control unit 630 that controls the movement of the coolant. The control unit 630 includes a storage unit 631 for storing the coolant, a first coolant dumping line 681 for transferring the coolant from the first coolant line 651 to the storage unit 631, a first coolant control line 682 for transferring the coolant to the coolant line 651, a second coolant dumping line 683 for transferring coolant from the bypass line 655 to the storage unit 631, and a second coolant control line 684 for transferring the coolant to the bypass line 655.

The first coolant dumping line 681 may be provided with a first valve 636 for regulating the flow rate of the coolant flowing from the first coolant line 651 to the storage unit 631, and the first coolant control line 682 may be provided with a first control pump 637 for controlling the coolant flowing from the storage unit 631 to the first coolant line 651.

The first coolant line 651 may be provided with a pressure sensor 685 for measuring the internal pressure of the first coolant line 651. If the temperature of the coolant rises for some reason, such as the supply of LNG being stopped or interrupted such that the internal pressure of the first coolant line 651 rises to exceed a critical pressure, the first valve 636 is opened so that the coolant may move to the storage unit 631 and, as a result, the internal pressure of the coolant supply line 651 is reduced.

Figure 11:
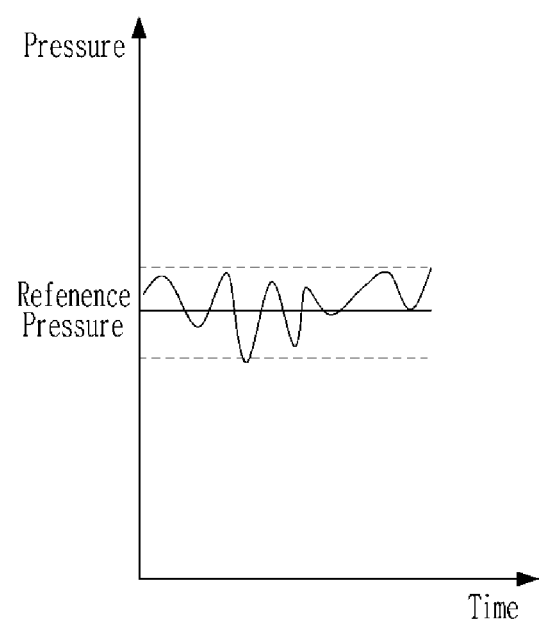
FIG. 11 is a graph illustrating control of the pressure of a coolant pipeline, according to the sixth embodiment of the present invention.

When the pressure of the first coolant line 651 is lower than the critical pressure, the first control pump 637 is operated to supply the coolant to the first coolant line 651 from the storage unit 631. On the other hand, when the pressure of the storage unit 631 is significantly low, an interlock may be provided to prevent the first control pump 637 from operating. Accordingly, as illustrated in FIG. 11, the pressure (reference pressure) of the first coolant line 651 may be controlled within a predetermined range.

The second coolant dumping line 683 may be provided with a second valve 638 for regulating the flow rate of the coolant flowing from the bypass line 655 to the storage unit 631, and the second coolant control line 684 may be provided with a second control pump 639 for controlling the coolant flowing from the storage unit 631 to the bypass line 655.

The bypass line 655 may be provided with a pressure sensor 686 for measuring the internal pressure of the bypass line 655. If the temperature of the coolant rises for some reason, such as the supply of LNG being stopped or interrupted such that the internal pressure of the bypass line 655 rises to exceed a critical pressure, the second valve 638 is opened so that the coolant may move to the storage unit 631 and, as a result, the internal pressure of the bypass line 655 is reduced. When the pressure of the bypass line 655 is lower than the critical pressure, the second control pump 639 is operated to supply the coolant to the bypass line 655 from the storage unit 631.

The control unit 630 may further include a first pump 632 installed in the first coolant line 651 to control the movement of the coolant and a second pump 634 installed in the bypass line 655 to control the movement of the coolant. The carbon dioxide capturing apparatus 600 according to the sixth embodiment may further include a temperature sensor 670 installed on the fourth gas line 674 and measuring the temperature of the flue gas discharged from the capturing cooler 641.

A pump control unit 633 for controlling the operation of the first pump 632 is connected to the first pump 632. The pump control unit 633 may be configured with a variable frequency drive (VFD). The pump control unit 633 controls the flow rate of the coolant flowing through the first pump 632. The pump control unit 633 may increase the flow rate of the coolant flowing through the first coolant line 651 when the temperature of the flue gas measured by the temperature sensor is higher than a reference temperature and decreases the flow rate of the coolant flowing through the first coolant line 651 when the temperature of the flue gas is lower than the reference temperature. The second pump 634 controls the flow rate of the coolant flowing through the bypass line 655. A pump control unit 635 is connected to the second pump 634, so that the flow rate of a second stream m2 which is divided by the second pump from the coolant can be controlled.

As described above, according to the sixth embodiment, since the coolant is cooled in two stages and a portion of the coolant is controlled to bypass, the coolant can be efficiently cooled to a cryogenic temperature. In addition, since the flue gas discharged from the power generation facility 610 is cooled in three stages by the gas heater 643, the gas cooler 642, and the capturing cooler 641, the cooling efficiency of the flue gas can be improved.

Hereinbelow, a carbon dioxide capturing apparatus 700 according to a seventh embodiment of the present disclosure will be described with reference to FIG. 12. Except for the configuration relative to a second exchanger 725, the carbon dioxide capturing apparatus 700 has the same structure as the carbon dioxide capturing apparatus 600 according to the sixth embodiment. Therefore, duplicate description of corresponding components will be omitted.

Figure 12:
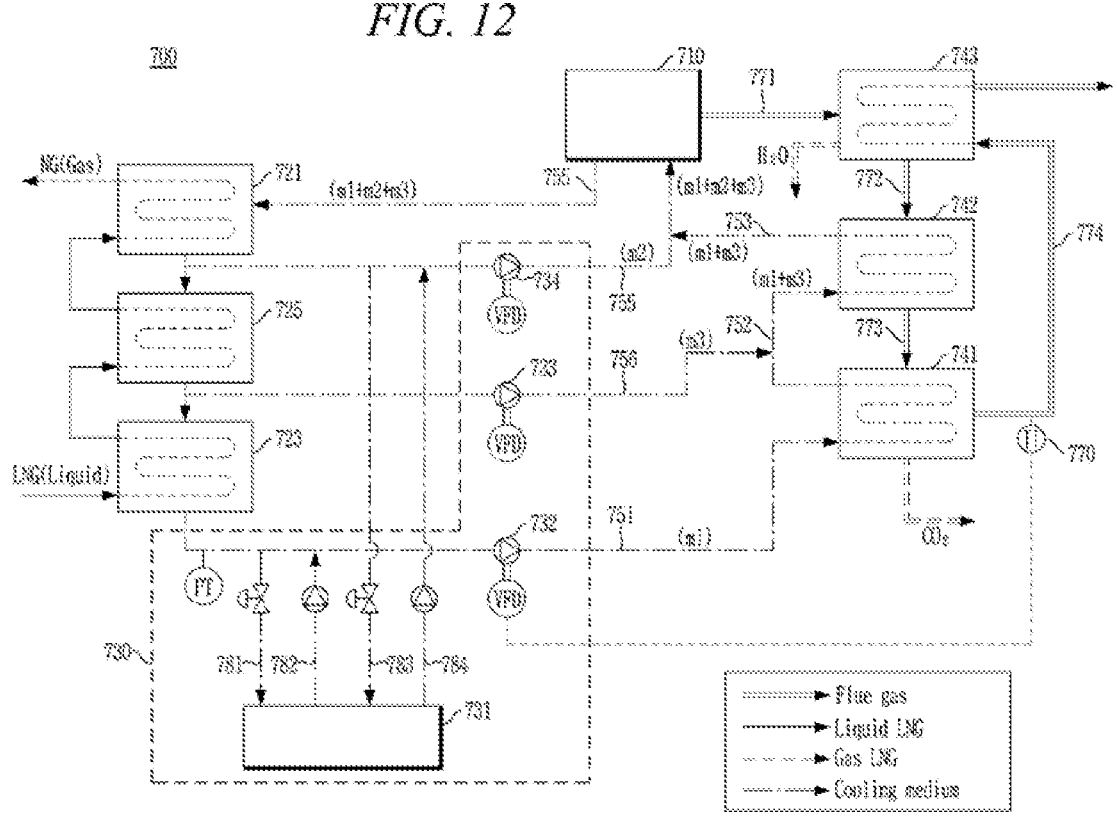
FIG. 12 is a block diagram of a carbon dioxide capturing apparatus using cold heat of liquefied natural gas, according to a seventh embodiment of the present invention.

Referring to FIG. 12, the carbon dioxide capturing apparatus 700 includes a first heat exchanger 721, a chiller 723, the second heat exchanger 725, a capturing cooler 741, a gas cooler 742, a gas heater 743, a control unit 730, and a bypass line 755.

The primary coolant cooled in the first heat exchanger 721 is divided into multiple streams. Among the streams, a first stream (first flow rate m1) of the primary coolant passes through the second heat exchanger 725 and the chiller 723 to become capturing coolant. This capturing coolant is supplied to the capturing cooler 741 and the gas cooler 742. Of the streams of the primary coolant discharged from the first heat exchanger 721, a second stream (second flow rate m2) of the primary coolant is supplied to the bypass line 755 and is cooled in the first heat exchanger 721 and the second heat exchanger 725. A third stream (third flow rate m3) of the primary coolant is introduced into the gas cooler 742 via the second coolant line 752.

The first stream, the second stream, and the third stream merge to flow through the bypass line 755. The merged stream is heated in a power generation facility 710 and then introduced into the first heat exchanger 721. In this way, the primary coolant circulates. The flow rate m1 of the first stream may be 20 to 40 wt % with respect to the total flow rate (m1+m2+m3) of the coolant, the flow rate m2 of the second stream may be 20 to 40 wt % with respect to the total flow rate of the coolant, and the flow rate m3 of the third stream may be 20 to 40 wt % with respect to the total flow rate of the coolant. For example, each of the flow rate m1 of the first stream and the flow rate m3 of the third stream may be 35 wt % with respect to the total flow rate of the coolant, and the flow rate m2 of the second stream may be 30 wt % with respect to the total flow rate of the coolant.

The capturing coolant discharged from the chiller 723 is supplied to the capturing cooler 741 through the first coolant line 751 and the coolant in the capturing cooler 741 is supplied to the gas cooler 742 through the second coolant line 752. The coolant in the gas cooler 742 is supplied to the bypass line 755 through the third coolant line 753. A portion of the coolant discharged from the second heat exchanger 725 is supplied to the second coolant line 752 through the fourth coolant line 756 and the remaining coolant is supplied to the chiller 723.

A first pump 732 for controlling the movement of the coolant is installed in the first coolant line 751, a second pump 734 for controlling the movement of the coolant is installed in the bypass line 755, and a third pump 733 for controlling the movement of the coolant may be installed in the fourth coolant line 756. A pump control unit (VFD) may be connected to each of the pumps 732, 733, and 734, thereby respectively controlling the operations of the pumps 732, 733, and 734.

The control unit 730 includes a storage unit 731 for storing the coolant, a first coolant dumping line 781 for transferring the coolant from the first coolant line 751 to the storage unit 731, a first coolant control line 782 for transferring the coolant to the coolant line 751, a second coolant dumping line 783 for transferring the coolant from the bypass line 755 to the storage unit 731, and a second coolant control line 784 for transferring the coolant to the bypass line 755. Valves may be provided on the coolant dumping lines 781 and 783, respectively, and a control pump may be connected to the coolant control lines 782 and 784.

The flue gas discharged from a power generation facility 710 is supplied to the gas heater 743 through the first gas line 771, the flue gas of the gas heater 743 is supplied to the gas cooler through the second gas line 772, and the flue gas of the gas cooler 642 is transferred to the capturing cooler 741 via the third gas line 773. The flue gas of the capturing cooler 741 is transferred to the gas heater 743 through the fourth gas line 774, and is then heated in the gas heater 743, and is then discharged.

Figure 13:
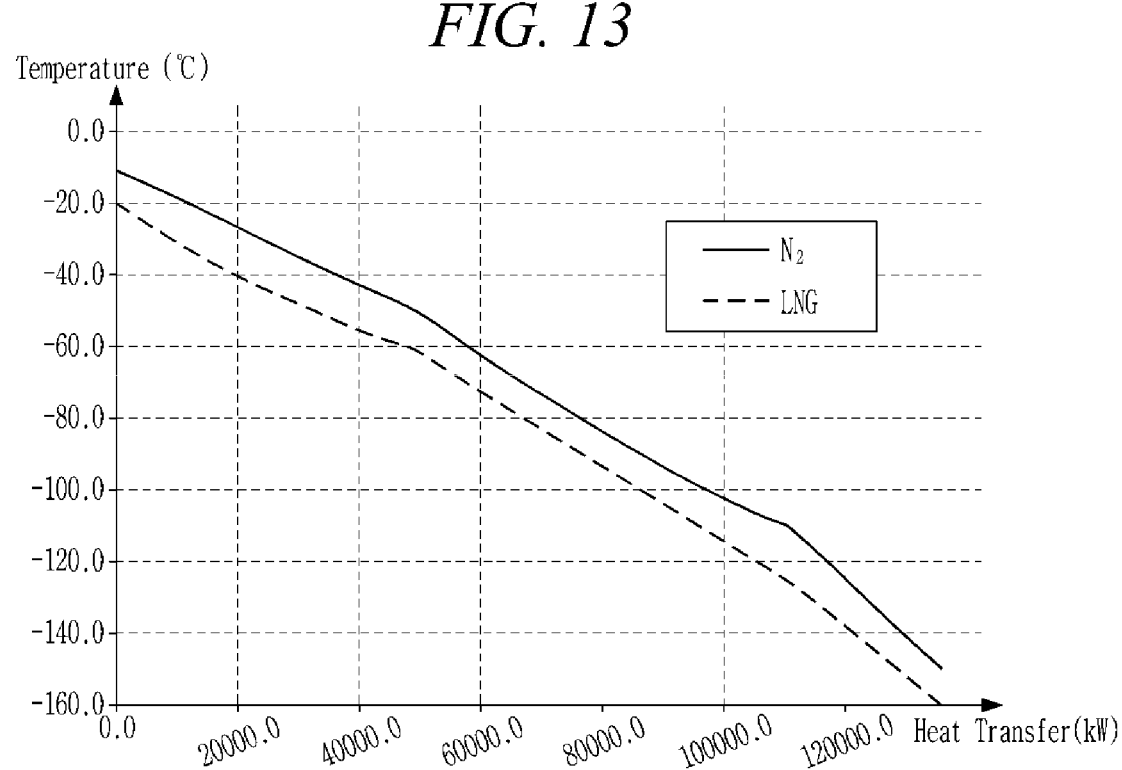
FIG. 13 is a graph illustrating a relationship between the temperature of a coolant and a heat transfer rate, according to the seventh embodiment of the present invention.

As illustrated in FIG. 13, according to the seventh embodiment, a portion of primarily cooled nitrogen is caused to bypass a secondary cooling stage, and the remaining nitrogen is secondarily cooled. Then, a portion of the secondarily cooled nitrogen is caused to bypass a third cooling stage and the remaining nitrogen is thirdly cooled and then supplied to the capturing cooler 741. Through this method, the coolant can be more easily cooled to the cryogenic temperature of −150° C.

In addition, according to the seventh embodiment, since the secondarily bypassed coolant is supplied to the gas cooler 742 to cool the flue gas before it flows into the capturing cooler 741, the cooling efficiency of the flue gas can be improved.

Hereinbelow, a carbon dioxide capturing apparatus according to an eighth embodiment of the present disclosure will be described with reference to FIG. 14, which shows a power generation system 800 including a carbon dioxide capturing apparatus 830 according to the eighth embodiment of the present invention.

Figure 14:
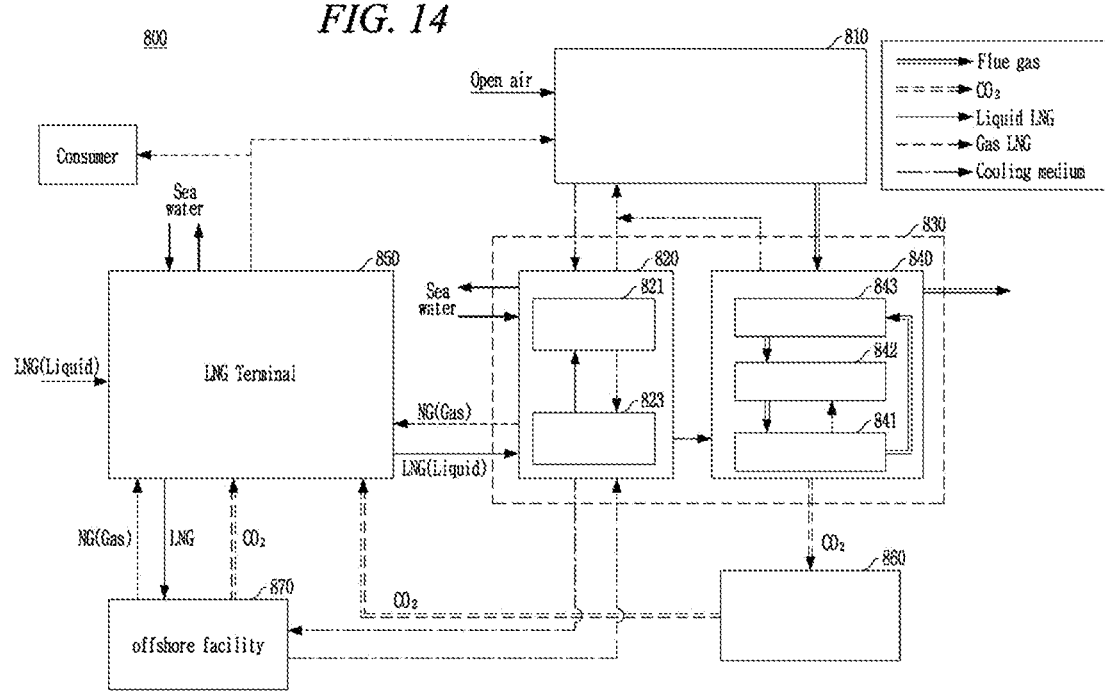
FIG. 14 is a block diagram of a power generation system including a carbon dioxide capturing apparatus according to an eighth embodiment of the present invention.

Referring to FIG. 14, the power generation system 800 of the eighth embodiment includes an LNG terminal 850, a power generation facility 810, the carbon dioxide capturing apparatus 830, a carbon dioxide transfer facility 860, and an offshore facility 870.

The LNG terminal 850 stores liquefied natural gas, converts a gaseous natural gas to a liquid natural gas (called liquefied natural gas), or regasifies the liquefied natural gas. Natural gas is extracted from an oil field. In order to mine natural gas buried underground, various equipment such as a hole-boring tool is needed. Facilities for injecting fracturing fluid into oil fields are also used for the extraction of natural gas. The mined natural gas is liquefied and transported in the form of liquefied natural gas by a transportation means such as an LNG carrier. The liquefied natural gas carried by a transportation means is stored in an LNG terminal 850. The LNG terminal 850 may be a floating, storage, regasification unit (FSRU) which can gasify the liquefied natural gas using seawater or dry ice.

The offshore facility 870 may be a floating storage facility installed on the sea, and particularly it may be an LNG ship. In addition, the offshore facility 870 may be an offshore drilling plant for producing natural gas or may be a gas refining facility. The offshore facility 870 may supply vaporized natural gas or liquefied natural gas to the LNG terminal 850. The offshore facility 870 may supply liquefied natural gas to the LNG terminal 850.

The power generation facility 810 generates power (e.g., electricity) using fuel, and discharges flue gas during electricity generation. In the present embodiment, the power generation facility 810 may be a gas turbine generator. Gas turbine generators generate electricity using natural gas. A gas turbine generator includes compressor, a combustor, and a turbine. The compressor takes in and compresses external air and sends the resulting compressed air to the combustor. The air enters a high pressure and high temperature state in the compressor 1210. The combustor mixes fuel and the compressed air introduced from the compressor and burns the resulting mixture. The fuel may be natural gas. Flue gas generated during combustion is discharged to the turbine. Turbine blades of the turbine are rotated by combustion gas, thereby causing the generator 1240 to rotate and thus generate electricity. The flue gas that has passed through the turbine flows into a gas heater 843 of the carbon dioxide capturing apparatus 830.

The carbon dioxide capturing apparatus 830 includes a heat exchange unit 820 and a capturing unit 840. The heat exchange unit 820 may include a heat exchanger 821 and a cooler 823. The capturing unit 840 may include a gas heater 843, a gas cooler 842, and a capturing cooler 841. The carbon dioxide capturing apparatus 830 may have the same internal structure as the carbon dioxide capturing apparatus 600 according to the sixth embodiment, and duplicate description will be omitted.

The natural gas in gaseous form that results from regasification performed by the carbon dioxide capturing apparatus 830 may be supplied to consumers via the LNG terminal 850. The carbon dioxide in the form of dry ice collected in the carbon dioxide capturing apparatus 830 may be supplied to a carbon dioxide transfer facility 860.

The carbon dioxide transfer facility 860 receives the solidified carbon dioxide in the form of dry ice from the carbon dioxide capturing apparatus 830 and stores it. If necessary, the dry ice is supplied to the LNG terminal 850 so that the dry ice is used to regasify liquefied natural gas or to cool equipment.

It will be apparent to those skilled in the art that various modifications, additions, and removals of some parts of the present invention may be made without departing from the spirit of the invention as defined in the appended claims, and ones resulting from the modifications, additions, and removals of the parts also will fall into the scope of the present invention.

What is claimed is:
1. A carbon dioxide capturing apparatus comprising:
    a heat exchanger configured to cool primary coolant using heat exchange between the primary coolant and liquefied natural gas (LNG);

a chiller connected to the heat exchanger and configured to discharge capturing coolant that is colder than the primary coolant by performing a heat exchange between the capturing coolant and a cooling material; and a capturing cooler configured to capture carbon dioxide contained in flue gas by performing a heat exchange between the capturing coolant discharged from the chiller and the flue gas, wherein a portion of the primary coolant discharged from the heat exchanger is transferred to the chiller and a remaining of the primary coolant is transferred to cool the flue gas before the flue gas flows into the capturing cooler.

2. The carbon dioxide capturing apparatus according to claim 1, wherein the cooling material is the primary coolant supplied from the heat exchanger, and the chiller cools the capturing coolant using the primary coolant supplied from the heat exchanger.

3. The carbon dioxide capturing apparatus according to claim 2, wherein the heat exchanger is connected to a first coolant line that is connected to the chiller to transport the primary coolant to the chiller, and the capturing cooler is connected to a second coolant line that is connected to the chiller, and wherein the chiller comprises a compressor connected to the second coolant line and configured to compress the capturing coolant, an expansion unit installed on the second coolant line and configured to expand the capturing coolant, and a condenser installed between the compressor and the expansion unit and configured to condense the capturing coolant by performing heat exchange with the primary coolant.

4. The carbon dioxide capturing apparatus according to claim 2, wherein the heat exchanger cools the primary coolant to a first temperature and cools the capturing coolant to a second temperature, and wherein the second temperature has an absolute value that is 1.4 to 2.0 times an absolute value of the first temperature.

5. The carbon dioxide capturing apparatus according to claim 2, further comprising a gas cooler configured to cool the flue gas before the flue gas flows into the capturing cooler, wherein the heat exchanger is connected to a coolant supply line for transferring the coolant discharged from the heat exchanger to the coolant supply line and is connected to a coolant recovery line for transferring the coolant discharged from the gas cooler to the heat exchanger, and wherein the chiller is connected to the coolant supply line and the coolant recovery line.

6. The carbon dioxide capturing apparatus according to claim 5, wherein the coolant supply line and the coolant recovery line are connected to a first heat transfer line for supplying cold heat to the chiller, wherein the chiller and the capturing cooler are connected by a chilling line for receiving the cold heat from the first heat transfer line and for transferring the cold heat to the capturing cooler, and wherein the chiller comprises a first compressor connected to the chilling line and configured to compress the capturing coolant, an expansion valve installed on the chilling line and configured to expand a coolant flowing along the chilling line, and a first condenser configured to condense the capturing coolant discharged from the first compressor by causing heat exchange with the first heat transfer line.

7. The carbon dioxide capturing apparatus according to claim 6, wherein the coolant supply line and the coolant recovery line are connected to a second heat transfer line configured to supply cold heat to the chiller, and wherein the chiller comprises a second compressor connected to the chilling line and configured to compress the capturing coolant discharged from the first condenser and a second condenser for condensing the capturing coolant discharged from the second compressor by using heat exchange with the second heat transfer line.

8. The carbon dioxide capturing apparatus according to claim 7, wherein the first coolant line and the coolant recovery line are connected to a third heat transfer line configured to supply cold heat to the chiller, and wherein the chiller comprises a third compressor connected to the chilling line and configured to compress the capturing coolant discharged from the second condenser and a third condenser for condensing the capturing coolant discharged from the third compressor by using heat exchange with the third heat transfer line.

9. The carbon dioxide capturing apparatus according to claim 6, further comprising:

a main compressor installed on the coolant supply line for controlling movement of the coolant;

a main temperature sensor for measuring the temperature of the flue gas discharged from the gas cooler; and a main compression control circuit for controlling operation of the main compressor according to information received from the main temperature sensor.

10. The carbon dioxide capturing apparatus according to claim 9, further comprising:

a first temperature sensor for measuring the temperature of the flue gas discharged from the capturing cooler;

a first compression control circuit for receiving information from the first temperature sensor and controlling operation of the first compressor; and a gas heater that heats the flue gas discharged from the capturing cooler and transfers a flue gas discharged from a power generation facility to the gas cooler, the gas heater including a water discharge portion for discharging condensate generated through condensation of the discharged flue gas.

11. The carbon dioxide capturing apparatus according to claim 1, further comprising a bypass line between the heat exchanger and the chiller for causing a portion of the primary coolant discharged from the heat exchanger to be transferred to a heat source, wherein the cooling material is made of liquefied natural gas, and the heat exchanger and the chiller are connected by a first natural gas line to transfer the liquefied natural gas discharged from the chiller to the heat exchanger, and wherein the chiller cools the primary coolant by performing a heat exchange between the liquefied natural gas and a portion of the primary coolant discharged from the heat exchanger.

12. The carbon dioxide capturing apparatus according to claim 11, wherein, when the flow rate of the coolant flowing into the chiller from the heat exchanger is m1 wt % and the flow rate of the coolant flowing into the bypass line from the heat exchanger is m2 wt %, m1 is 0.4 to 1.5 times m2.

13. The carbon dioxide capturing apparatus according to claim 11, further comprising a temperature sensor for measuring the temperature of the flue gas discharged from the capturing cooler,
- wherein the chiller is connected to a first coolant line for transferring the capturing coolant discharged from the chiller to the capturing cooler, and
- wherein the first coolant line includes a control unit for controlling movement of the capturing coolant along the first coolant line according to information received from the temperature sensor.

14. The carbon dioxide capturing apparatus according to claim 13, wherein the control unit includes:
- a storage unit connected to the first coolant line for storing the coolant,
- a first coolant dumping line for transferring the coolant from the first coolant line to the storage unit,
- a second coolant dumping line connected to the first coolant line and configured to transfer the coolant from the bypass line to the storage unit, and
- a capturing coolant control line for transferring the coolant from the storage unit to the bypass line.

15. The carbon dioxide capturing apparatus according to claim 11, further comprising a gas cooler configured to cool the flue gas before the flue gas flows into the capturing cooler,
- wherein the gas cooler is connected to a second coolant line for transferring the coolant discharged from the capturing cooler to the gas cooler.

16. The carbon dioxide capturing apparatus according to claim 15, further comprising:
- a second heat exchanger installed between the heat exchanger and the chiller;
- a coolant transfer line connected to the second heat exchanger and configured to transport part of the coolant discharged from the second heat exchanger to the second coolant line;
- a first natural gas line connected to the second heat exchanger for transferring the liquefied natural gas discharged from the chiller to the second heat exchanger; and
- a second natural gas line connected to the heat exchanger for transferring the liquefied natural gas discharged from the second heat exchanger to the heat exchanger.

17. The carbon dioxide capturing apparatus according to claim 15, further comprising a third coolant line that connects the gas cooler and the bypass line to each other and transfers the coolant discharged from the gas cooler to the bypass line.

18. The carbon dioxide capturing apparatus according to claim 11, further comprising a gas heater that heats the flue gas discharged from the capturing cooler using the flue gas discharged from a heat source and cools the flue gas discharged from the heat source,
- wherein the gas heater includes a water discharge portion for discharging condensate generated through condensation of the discharged flue gas.

19. A power generation system using cold heat of liquefied natural gas (LNG), the system comprising:
- an LNG storage facility for storing the LNG;
- a power generation facility for generating power using fuel and discharging flue gas;
- a heat exchange unit in which heat exchange occurs between the LNG supplied from the LNG storage facility and a coolant so that the LNG is regasified into natural gas and the coolant is cooled, the heat exchange unit comprising a heat exchanger in which the coolant is cooled to a first temperature through heat exchange between the coolant and the LNG, and a chiller that discharges a capturing coolant generated through heat exchange between a portion of the coolant discharged from the heat exchanger and the LNG; and
- a capturing unit for capturing carbon dioxide contained in the flue gas by causing heat exchange between the discharged flue gas and the coolant, the capturing unit comprising a capturing cooler for separating carbon dioxide contained in the flue gas through heat exchange between the capturing coolant discharged from the chiller and the flue gas, and a gas cooler that preliminarily cools the flue gas using the coolant discharged from the capturing cooler before the flue gas flows into the capturing cooler.

20. The power generation system according to claim 19, wherein the heat exchange unit further comprises a bypass line allowing a portion of the coolant discharged from the first exchanger to directly flow into the power generation facility while bypassing the heat exchange unit, and
- wherein the capturing unit further comprises a gas heater that heats the flue gas discharged from the capturing cooler and cools the flue gas discharged from the power generation facility by causing heat exchange between the flue gas discharged from the power generation facility and the flue gas discharged from the capturing cooler.

* * * * *